(12) United States Patent
Fang et al.

(10) Patent No.: US 12,551,438 B2
(45) Date of Patent: Feb. 17, 2026

(54) NANOBOWL-SUPPORTED DRUG-LOADED LIPOSOME, PREPARATION METHOD THEREFOR AND APPLICATION THEREOF

(71) Applicants: SHANGHAI JIAO TONG UNIVERSITY SCHOOL OF MEDICINE, Shanghai (CN); SHANGHAI SECOND MEDICAL INVESTMENT MANAGEMENT CO., LTD, Shanghai (CN)

(72) Inventors: Chao Fang, Shanghai (CN); Zhongjian Chen, Shanghai (CN); Sicong Yang, Shanghai (CN)

(73) Assignees: SHANGHAI JIAO TONG UNIVERSITY SCHOOL OF MEDICINE, Shanghai (CN); SHANGHAI SECOND MEDICAL INVESTMENT MANAGEMENT CO., LTD, Shanghai (CN)

( * ) Notice: Subject to any disclaimer, the term of this patent is extended or adjusted under 35 U.S.C. 154(b) by 662 days.

(21) Appl. No.: 17/791,815

(22) PCT Filed: Nov. 4, 2020

(86) PCT No.: PCT/CN2020/126529
§ 371 (c)(1),
(2) Date: Jul. 8, 2022

(87) PCT Pub. No.: WO2021/174894
PCT Pub. Date: Sep. 10, 2021

(65) Prior Publication Data
US 2023/0052618 A1 Feb. 16, 2023

(30) Foreign Application Priority Data

Mar. 3, 2020 (CN) .......................... 202010145448.8

(51) Int. Cl.
| | | |
|---|---|---|
| *A61K 9/1273* | (2025.01) | |
| *A61K 9/1278* | (2025.01) | |
| *A61K 31/4745* | (2006.01) | |
| *A61K 31/475* | (2006.01) | |
| *A61K 31/704* | (2006.01) | |

(52) U.S. Cl.
CPC .......... *A61K 9/1273* (2013.01); *A61K 9/1278* (2013.01); *A61K 31/4745* (2013.01); *A61K 31/475* (2013.01); *A61K 31/704* (2013.01)

(58) Field of Classification Search
CPC ............... A61K 9/1273; A61K 9/1278; A61K 31/4745; A61K 31/475; A61K 31/704; A61K 9/1271; A61K 9/1277; A61K 9/19; A61K 47/02; A61K 47/24; A61K 47/32; A61P 35/00
See application file for complete search history.

(56) References Cited

U.S. PATENT DOCUMENTS

| | | | | |
|---|---|---|---|---|
| 2009/0169610 A1* | 7/2009 | Yamazaki | ............ | A61K 31/573 424/130.1 |
| 2012/0059240 A1* | 3/2012 | Sailor | ................. | A61K 9/1271 435/7.1 |
| 2017/0119891 A1* | 5/2017 | Lal | ...................... | A61K 9/5192 |

FOREIGN PATENT DOCUMENTS

| | | |
|---|---|---|
| CN | 111228222 A | 6/2020 |
| WO | 2015192149 A2 | 12/2015 |

OTHER PUBLICATIONS

Chen et al. (Preparation, Characterization and Evaluation of Drug-Loaded Function of Nano bowls, May 28, 2018, vol. 38 Issue (5)) (Year: 2018).*
Feb. 7, 2021 International Search Report issued in International Patent Application No. PCT/CN2020/126529.
Feb. 7, 2021 Written Opinion of the International Searching Authority issued in International Patent Application No. PCT/CN2020/126529.
Chinese priority application No. 202010145448.8.
Chen Zhong-Jian et al.. "Nanobowl-Supported Liposomes Improve Drug Loading and Delivery," Nano Lett, vol. 20 No. 620 May 2020 (May 20, 2020) pp. 4177-4187.
Chen Zhong-Jian et al. "Preparation, Characterization and Evaluation of Drug-loaded Function of Nanobowls", Journal of Shanghai Jiaotong University(Medical Science), vol. 38. No. 5. May 31, 2018 (May 31, 2018), pp. 493-498.
Xiong Lin et al., "A mesoporous organosilica nano-bowl with high DNA loading capacity a potential gene delivery carrier," Nanoscale, vol. 8 No. 4020 Sep. 2016 (Sep. 20, 2016) pp. 17446-17450.

(Continued)

*Primary Examiner* — Frederick F Krass
*Assistant Examiner* — Abdulrahman Abbas
(74) *Attorney, Agent, or Firm* — Houston Beshining Law Office PLLC; Liangang Ye

(57) ABSTRACT

A nanobowl-supported drug-loaded liposome, a preparation method therefor, and an application thereof. The preparation method for the nanobowl-supported drug-loaded liposome comprises: incubating and ultrasonically treating a nanobowl and a liposome and then successfully encapsulating a drug by utilizing an ammonium sulfate active drug loading method to obtain the nanobowl-supported drug-loaded liposome. The nanobowl-supported drug-loaded liposome can resist the influence of plasma proteins and blood flow shearing forces on drug leakage, enhance the delivery of the drug at a tumor site, improve carrier stability, and improve an anti-tumor curative effect.

6 Claims, 9 Drawing Sheets

(56) References Cited

OTHER PUBLICATIONS

Koshiyama Kenichiro et al., "Collapse ofa lipid-coated nanobubble and subsequent liposome formation," Scientific Reports, Jun. 16, 2016 (Jun. 16, 2016), pp. 1-8.
English translation of Chinese priority application No. 202010145448.8.

* cited by examiner

NANOBOWL-SUPPORTED DRUG-LOADED LIPOSOME, PREPARATION METHOD THEREFOR AND APPLICATION THEREOF

The present application is a National Stage of International Application No. PCT/CN2020/126529, filed on Nov. 4, 2020, which claims priority of the Chinese Patent Application No. CN202010145448.8 filed on Mar. 3, 2020, the contents of which are incorporated herein by reference in their entireties.

TECHNICAL FIELD

The present disclosure relates to the field of medical technology, and in particular to nanobowl-supported drug-loaded liposome, preparation method therefor and application thereof.

Background

Cancer, that is, malignant tumor, has become the second leading cause of death in the world, seriously threatening human life and health. According to the latest data released by the World Health Organization on Feb. 3, 2017. Every year, 8.8 million people die from cancer, accounting for nearly one-sixth of all global deaths and more than 14 million new cases of cancer occur each year, which is expected to rise to more than 21 million by 2030. How to break through the world difficult problem of cancer has become a hot issue in the field of life science.

However, for cancer treatment drugs, the therapeutic efficacy is greatly limited due to their toxicity to normal tissue cells and extremely rapid clearance rate. The combination of biocompatibility, ideal long circulation time, and accurate targeting has allowed the development of nanocarrier technology that can overcome the limitations of the drug itself, to get better therapeutic effect.

One of the important mechanism of action by which nano-drugs can do what so many drugs alone cannot is Enhanced Permeability and Retention (EPR). The EPR effect refers to the phenomenon that some macromolecular substances of a specific size (such as liposomes, nanoparticles, and some macromolecular drugs) are more likely to penetrate into tumor tissues and are retained for a long time (compared to normal tissues). The EPR effect-based nano-drug treatment strategy is to increase the drug efficacy and body tolerance by changing the pharmacokinetics and biodistribution of the drug to maximize the peak drug concentration (Cmax) and increase the area under the drug concentration-time curve (AUC) at plasma and tumor tissue, thus prolonging the drug treatment level at the target site. Among them, liposomes, as the first nanoparticles approved for anti-tumor therapy, together with the rest of nanoparticles designed on the basis of liposomes, occupy a considerable proportion in clinical nano-therapy. However, although encapsulation of chemotherapeutic drugs in liposomes can improve the pharmacokinetics and biological tissue distribution of the drugs, the currently marketed liposomal pharmaceutical preparations do not significantly improve the overall survival rate compared to traditional chemotherapeutic drugs. Thus, liposome delivery systems still face difficulties and challenges.

Among many challenges, the stability of liposomes is crucial, which determines the changes of drug loading, leakage rate and drug release rate during the preparation, storage and in vivo metabolism of drug-loaded liposomes. Phospholipids are the main components of liposomes, and some of them contain unsaturated fatty acid branches. These phospholipids are easily oxidized and hydrolyzed, resulting in decreased mobility of phospholipid bilayer, increased permeability, increased aggregation, increased drug leakage rate and decreased drug loading. Studies have shown that the properties of liposomes formed by different phospholipid components will change accordingly, thus affecting the stability and release rate of liposomes. Phase transition temperature, as another important factor, affects the stability of liposomes upon storage. When the temperature exceeds the phase transition temperature of the phospholipid, the phospholipid will change from gel state to liquid crystal state, so that the lipid bilayer structure is loose, the stability is decreased, the drug is released and the storage period is shortened. In addition, thermosensitive liposomes are also based on the principle of phase transition temperature, which is changed to control drug release.

The stability of liposomes in vivo is undoubtedly the key to determine drug efficacy. Clearly, the EPR effect theory alone may not fully explain a series of changes that occur in liposomes in the body. Since the nanoparticles need to go through many biological processes after intravenous injection and before reaching tumor tissues, such as hydrodynamic action of blood circulation system, interaction with various types of proteins and cytokines, tissue permeation of nanoparticles, etc. The changes of shear force in the blood stream can change the degree of liposome deformation and affect the stability of liposomes; studies have shown that high density lipoproteins in serum can combine with phospholipids to form holes and gaps; liposomes can activate the complement system and form hydrophilic channels on the surface of liposomes, leading to increased liposome permeability and a large amount of leakage of the contents; serum albumin can even combine with liposomes to form a "crown" structure, affecting the stability of liposomes; at the same time, the mononuclear phagocyte system in the circulatory system is able to rapidly recognize liposomes and rapidly clear them. Therefore, how to improve the composition, morphology, size, zeta potential, surface characteristics of liposomes in order to overcome the above dilemma and better play the efficacy of liposome drugs is very important.

The present disclosure aims to establish a novel liposomal delivery system, nanobowls@Dox-liposomes, based on the current challenges faced by liposomal pharmaceutical preparations. The nanobowl, due to its unique morphology, provides sufficient lumen space for successful loading of doxorubicin while imparting sufficient rigid support to the liposomes. Doxorubicin liposomes, as the first marketed nano-drug, have shown some improvement in the treatment of cancer patients after many years of clinical application, but also exposed some of their own shortcomings. The addition of nanobowl is expected to solve some practical problems, which has high scientific value and potential clinical significance. The present disclosure comprehensively evaluated the in vivo anti-tumor efficacy of nanobowls@Dox-liposomes by examining the different effects of nanobowls@Dox-liposomes on tumor tissue and normal tissue.

The nanobowl-supported drug-loaded liposome of the present disclosure, preparation method therefor and application thereof have not been reported.

SUMMARY

A first object of the present disclosure is to address the deficiencies of the prior art by providing a nanobowl-supported drug-loaded liposome.

A second object of the present disclosure is to address the deficiencies of the prior art to provide a preparation method of a nanobowl-supported drug-loaded liposome as described above.

A third object of the present disclosure is to address the deficiencies of the prior art and to provide an application of a nanobowl-supported drug-loaded liposome as described above.

A fourth object of the present disclosure is to address the deficiencies of the prior art by providing a nanobowl-supported doxorubicin/irinotecan/vincristine liposomes.

A fourth object of the present disclosure is to address the deficiencies of the prior art by providing a preparation method of nanobowl-supported doxorubicin/irinotecan/vincristine liposomes as described above.

In order to achieve the first purpose, the present disclosure provides the following technical scheme:

a nanobowl-supported drug-loaded liposome, the preparation method therefor comprises the following steps:
  (1) preparation of the nanobowl: preparing polystyrene nanoparticles→preparing MPS coated modified polystyrene nanoparticles→preparing peanuts nanoparticles preparing silica modified peanuts nanoparticles→obtaining a nanobowl;
  (2) preparation of nanobowl-supported unloaded liposomes: taking APTES and the nanobowl prepared in step (1) to perform amination modification of the nanobowl to obtain an aminated nanobowl→transferring the aminated nanobowl into a prepared ammonium sulphate solution by a centrifugal method to obtain an ammonium sulphate solution of the aminated nanobowl, shaking same to form vesicles encapsulated with the nanobowl performing probe ultrasound on the vesicles encapsulated with the nanobowl to obtain nanobowl-supported unloaded liposomes;
  (3) preparation of nanobowl-supported drug-loaded liposomes: encapsulating the drug by active loading of ammonium sulfate to obtain the nanobowl-supported drug-loaded liposome.

Preferably, the drug in step (3) is selected from any one of doxorubicin, irinotecan and vincristine.

In order to achieve the second purpose, the present disclosure provides the following technical scheme:

a preparation method of the nanobowl-supported drug-loaded liposome as described above, comprises the following steps:
  (1) preparation of the nanobowl: preparing polystyrene nanoparticles→preparing MPS coated modified polystyrene nanoparticles→preparing peanuts nanoparticles preparing silica modified peanuts nanoparticles→obtaining a nanobowl;
  (2) preparation of nanobowl-supported unloaded liposomes: taking APTES and the nanobowl prepared in step (1) to perform amination modification of the nanobowl to obtain an aminated nanobowl→transferring the aminated nanobowl into a prepared ammonium sulphate solution by a centrifugal method to obtain an ammonium sulphate solution of the aminated nanobowl, shaking same to form vesicles encapsulated with the nanobowl performing probe ultrasound on the vesicles encapsulated with the nanobowl to obtain nanobowl-supported unloaded liposomes;
  (3) preparation of nanobowl-supported drug-loaded liposomes: encapsulating the drug by active loading of ammonium sulfate to obtain the nanobowl-supported drug-loaded liposome.

In order to achieve the third purpose, the present disclosure provides the following technical scheme:

use of the nanobowl-supported drug-loaded liposome as described above in the manufacture of an antitumor drug. In order to achieve the fourth purpose, the present disclosure provides the following technical scheme:

nanobowl-supported doxorubicin/irinotecan/vincristine liposome, the preparation method therefor comprises the following steps:
  (1) preparation of the nanobowl: preparing polystyrene nanoparticles→preparing MPS coated modified polystyrene nanoparticles→preparing peanuts nanoparticles preparing silica modified peanuts nanoparticles→obtaining a nanobowl;
  (2) preparation of nanobowl-supported unloaded liposomes: taking APTES and the nanobowl prepared in step (1) to perform amination modification of the nanobowl to obtain an aminated nanobowl→transferring the aminated nanobowl into a prepared ammonium sulphate solution by a centrifugal method to obtain an ammonium sulphate solution of the aminated nanobowl, shaking same to form vesicles encapsulated with the nanobowl performing probe ultrasound on the vesicles encapsulated with the nanobowl to obtain nanobowl-supported unloaded liposomes;
  (3) preparation of nanobowl-supported doxorubicin/irinotecan/vincristine liposomes: encapsulating doxorubicin/irinotecan/vincristine by active loading of ammonium sulfate to obtain nanob owl-supported doxorubicin/irinotecan/vincristine liposomes.

Preferably, characterized in that the polystyrene nanoparticles of step (1) have a particle size of 45-55 nm; the peanuts nanoparticles are prepared by a styrene monomer and MPS modified polystyrene nanoparticles according to Vstyrene: VMPSNPs=3:1; the silica-modified peanuts nanoparticles are prepared with 0.3 g of TEOS.

Preferably, characterized in that the nanobowl-supported doxorubicin/irinotecan/vincristine liposome has an average particle size of 140-150 nm and a Zeta potential of −18 to −16 mV.

In order to achieve the fifth purpose, the present disclosure provides the following technical scheme:

a preparation method of the nanobowl-supported doxorubicin/irinotecan/vincristine liposome as described above, comprises the following steps: (1) preparation of the nanobowl: preparing polystyrene nanoparticles→preparing MPS coated modified polystyrene nanoparticles→preparing peanuts nanoparticles→preparing silica modified peanuts nanoparticles→obtaining a nanobowl;
  (2) preparation of nanobowl-supported unloaded liposomes: taking APTES and the nanobowl prepared in step (1) to perform amination modification of the nanobowl to obtain an aminated nanobowl→transferring the aminated nanobowl into a prepared ammonium sulphate solution by a centrifugal method to obtain an ammonium sulphate solution of the aminated nanobowl, shaking same to form vesicles encapsulated with the nanobowl performing probe ultrasound on the vesicles encapsulated with the nanobowl to obtain nanobowl-supported unloaded liposomes;
  (3) preparation of nanob owl-supported doxorubicin/irinotecan/vincristine liposomes: encapsulating doxorubicin/irinotecan/vincristine by active loading of ammonium sulfate to obtain nanob owl-supported doxorubicin/irinotecan/vincristine liposomes.

Preferably, the preparation method of the nanobowl in step (1) is:
1) preparation of polystyrene nanoparticles: synthesizing polystyrene nanoparticles by emulsion polymerization with styrene as monomer, SDS as emulsifier and KPS as initiator;
2) preparation of MPS-coated modified polystyrene nanoparticles: adding styrene, MPS and AIBN on the basis of the synthesized polystyrene nanoparticles to synthesize MPS-coated modified polystyrene nanoparticles through a polymerization reaction;
3) preparation of peanuts nanoparticles: mixing the MPS coated modified polystyrene nanoparticles prepared in 2) with styrene and VBS, stirring same in ultrapure water, using the swelling effect of polystyrene to make MPS coated modified polystyrene nanoparticles deform and burst, then adding AIBN to initiate polymerization reaction again, and finally forming peanut-shaped nanoparticles;
4) preparation of silica-modified peanuts nanoparticles: transferring the peanuts nanoparticles obtained in 3) into anhydrous ethanol by means of ultracentrifugation and redispersion, then adding 25% ammonium hydroxide solution water to prepare an ethanol solution containing 50% TEOS, and slowly adding dropwise to obtain silica-modified peanuts nanoparticles;
5) preparation of nanobowls: transferring the silica-modified peanuts nanoparticles obtained in 4) to a rotary evaporator, evaporating excess ethanol, adding tetrahydrofuran to dissolve, and collecting the precipitate by ultracentrifugation to obtain the final product, a nanobowl.

Preferably, the polystyrene nanoparticles of step (1) have a particle size of 50 nm; the peanuts nanoparticles are prepared by a styrene monomer and MPS modified polystyrene nanoparticles according to $V_{styrene}:V_{MPSNPs}=3:1$; the silica-modified peanuts nanoparticles are prepared with 0.3 g of TEOS.

The nanobowls@Dox-liposome prepared in the present disclosure provides a "hard" inner container for the liposome through the supporting role of the nanobowl, so that the liposome can endure the impact and destruction action of various factors in the circulatory system, reduces the leakage of the content drug as much as possible before reaching the tumor site, allows more doxorubicin to reach the tumor site with the circulatory system, and improves the stability of the active drug-loaded liposomal doxorubicin (DOX), thereby better exerting the drug therapeutic effect.

The present disclosure has the advantages of:
1. The nanobowl-supported drug-loaded liposome of the present disclosure can resist the influence of plasma proteins and blood flow shearing forces on drug leakage, which enhance the delivery of the drug at a tumor site, improve carrier stability, and improve an antitumor curative effect. In contrast to other methods of altering liposome bilayer, composition, etc. to enhance stability, this method designs a physical support for the cavity of whole-water nano-liposomes. Nanobowl stabilized liposomes improve carrier stability and drug release.
2. The present disclosure overcomes the defects of the prior art (due to drug leakage in the blood circulation, the delivery of liposomal drugs for cancer treatment may be limited), improves the stability of active drug-loaded liposomal drugs by embedding a rigid nanobowl in the water cavity of the liposome, optimizes the types of raw materials and the ratio and process parameters between them, and obtains a nanobowl-supported drug-loaded liposome with the best therapeutic effect. The nanobowl-supported drug-loaded liposome can resist the influence of plasma proteins and blood flow shearing forces on drug leakage, which enhance the delivery of the drug at a tumor site, improve carrier stability, and improve an antitumor curative effect without toxic side effect. In contrast to other methods of altering liposome bilayer, composition, etc. to enhance stability, this method designs a physical support for the cavity of whole-water nano-liposomes, which improves the survival rate of breast cancer patients and reduces the economic burden of such patients, so it has a good application prospect.

DETAILED DESCRIPTION OF THE PREFERRED EMBODIMENT

Figure 1:
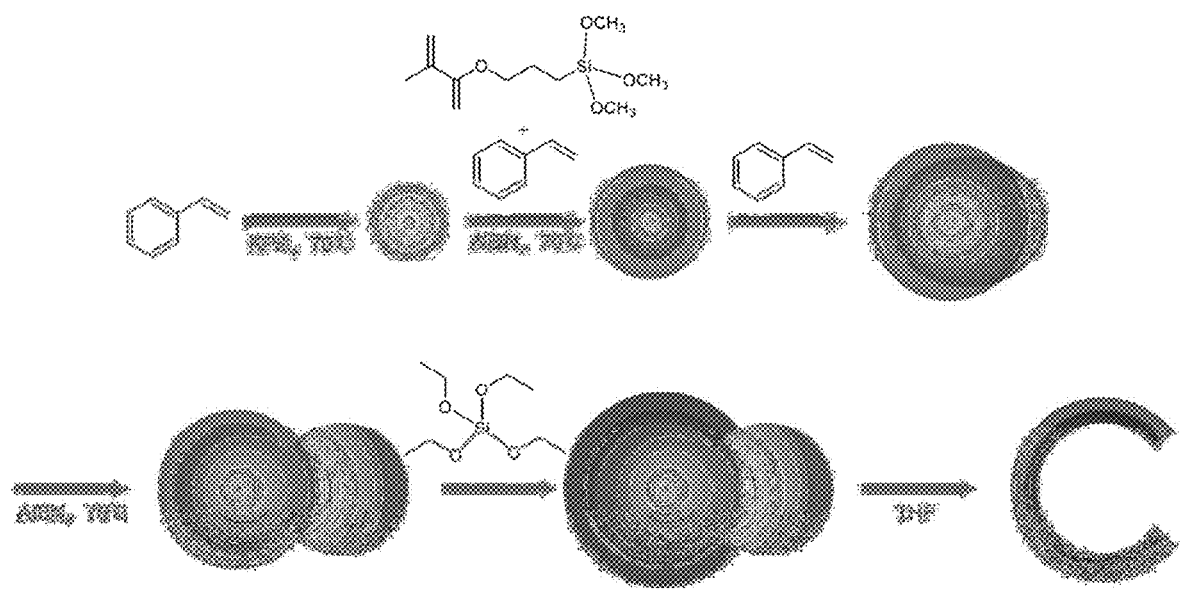
FIG. 1 is a schematic diagram of a nanobowl synthetic route.

The invention will now be further described with reference to specific embodiments. It should be understood that these examples are illustrative only and are not intended to limit the scope of the present disclosure. Furthermore, it will be appreciated that those skilled in the art, upon reading the description of the present disclosure, may make various changes and modifications to the present disclosure, and that such equivalents are intended to fall within the scope of the appended claims.

The abbreviations described in the present disclosure are listed in Table 1.

TABLE 1

| Abbreviations | English full name | Chinese full name |
|---|---|---|
| PSNPs | Polystyrene Nanoparticles | 聚苯乙烯纳米颗粒 |
| MPSNPs | MPS coated Polystyrene Nanoparticles | 包覆改性的聚苯乙烯纳米颗粒 |
| PNPs | Peanuts Nanoparticles | 花生状纳米颗粒 |
| Si-PNPs | Silica Peanuts Nanoparticles | 二氧化硅改性的花生状纳米颗粒 |
| NB@LP | Nanobowls@Liposomes | 纳米碗支撑脂质体 |
| NB@DLP | Nanobowls@Dox-Liposomes | 纳米碗支撑阿霉素脂质体 |
| DLP | Dox-Liposomes | 阿霉素脂质体 |
| AIBN | 2-2-Azobis 2-methyl propionitrile | 偶氮二异丁腈 |
| KPS | Potassium persulfate | 过硫酸钾 |
| PS | Polystyrene | 聚苯乙烯 |
| MPS | 3-Trimethoxysilylpropyl methacrylate | 3-(三甲氧基甲硅基)甲基丙烯酸丙酯 |
| VBS | Sodium 4-vinylbenzenesulfonate | 对苯乙烯磺酸钠 |
| SDS | Sodium dodecyl sulfate | 十二烷基硫酸钠 |
| TEOS | Tetraethylorthosilicate | 正硅酸乙酯 |
| 25% NH3 | 25% Ammonium hydroxide solution | 25%浓氨水 |
| THF | Tetrahydrofuran | 四氢呋喃 |
| APTES | (3-Aminopropyl )triethoxysilane | 氨丙基三乙氧基硅烷 |
| Chol | Cholesterol | 胆固醇 |
| HSPC | L-α-phosphatidylcholine, hydrogenated(Soy) | 氢化大豆磷脂 |
| DSPE-PEG2000 | 1,2-distearoyl-sn-glycero-3-phosphoethanola mine-N-[methoxy (polyethylene glycol)-2000] | 二硬脂酰磷脂酰乙醇胺-聚乙二醇 2000交联物 |
| Dox | Doxorubicin | 阿霉素 |
| DAPI | 4',6-diamidino-2-phenylindole | 二烷基苯基吲哚 |
| DLS | dynamic light scattering | 动态光散射 |
| PDI | polydispersity index | 多分散指数 |
| FBS | Fetal bovine serum | 胎牛血清 |
| PBS | phosphate buffered saline | 磷酸盐缓冲液 |

TABLE 1-continued

List of abbreviations

| Abbreviations | English full name | Chinese full name |
|---|---|---|
| TEM | transmission electron microscopy | 光密度 |
| OD | optical density | 透射电子显微镜 |
| HPLC | high performance liquid chromatography | 高效液相色谱 |
| CLSM | confocal laser scanning microscopy | 共聚焦激光扫描显微镜 |

EXAMPLE 1

Construction and Characterization of a Nanobowl

I. Construction of nanobowl
1 Instruments and Materials
1.1 Instruments and Equipment

TABLE 2

| | |
|---|---|
| XS205s electronic balance | METTLER TOLEDO |
| HS-70 thermostatic magnetic stirrer | IKA, Germany |
| HD2010W constant speed electric stirrer | Shanghai Sile Instrument Co. Ltd. |
| BT100-2J peristaltic pump | Baoding Longer Pump Co. Ltd. |
| R-200 rotary evaporator | Buchi, Switzerland |
| Sorvall ST 16 frozen centrifuge | ThermoFisher, USA |
| Optima ™MXPN ultra centrifuge | Beckman Instruments, Inc. USA |
| CM-120 transmission electron microscope | Philips, Netherlands |
| Malvern Zetasizer Nano ZS laser particle sizer | Malvern Company, British |
| MS2 vortex mixer | IKA, Germany |
| Laboratory ultrapure water system | Millipore Company, USA |

1.2 Materials and Reagents

TABLE 3

| | |
|---|---|
| Styrene | Sigma Inc. USA |
| SDS | Sangon Biotech (Shanghai) |
| KPS | Shanghai Aladdin Chemical Reagent Co. Ltd. |
| MPS | Sigma Inc. USA |
| AIBN | Shanghai Aladdin Chemical Reagent Co. Ltd. |
| VBS (90%) | Sigma Inc. USA |
| TEOS | Sigma Inc. USA |
| Anhydrous ethanol | Sinopharm Chemical Reagent Co. Ltd. |
| 25% Ammonium hydroxide solution | Shanghai Aladdin Chemical Reagent Co. Ltd. |
| Tetrahydrofuran | Sinopharm Chemical Reagent Co. Ltd. |

2 Experimental Method
2.1 Polystyrene Nanoparticle Synthesis

Polystyrene nanoparticles with a size of 50 nm were synthesized by emulsion polymerization. The specific steps are as follows:

1) accurately weighing 1.00 g sodium dodecyl sulfonate and placing into a clean 250 mL three-necked flask;
2) using a 100 mL measuring cylinder to accurately measure 85 mL of ultrapure water, and pouring it into a 250 mL three-necked flask containing sodium dodecyl sulfonate;
3) connecting an Allihn condenser and two rubber plugs are respectively connected to three bottle mouths of the three-necked flask;
4) inserting a needle into the rubber plug of one of the bottle mouths of the three-necked flask, so that the needle is completely submerged to below the liquid level, and at the same time connecting a catheter to the other end of the needle, and the other end of the catheter is in communication with argon;
5) opening the valve of the argon cylinder, introducing argon into the three-necked flask, adjusting the valve, controlling the flow rate of argon, and observing that the liquid surface of the three-necked flask is evenly bubbled;
6) meanwhile, maintaining stirring at 250 rpm for 1 h by a HS-70 thermostatic magnetic stirrer;
7) removing the needle on the three-neck flask, and transferring the catheter with argon gas to the Allihn condenser to keep ventilation;
8) accurately transferring 20.00 g of styrene monomer, using a 50 mL syringe to insert a rubber plug, injecting it into a three-necked flask, and continuing to keep magnetic stirring for 30 min;
9) opening a temperature rising switch of the thermostatic magnetic stirrer, and adjusting the temperature so that the reaction system is heated to 70° C.;
10) accurately weighing 0.10 g of potassium persulfate, adding it into 10 mL of ultrapure water, using MS2 vortex mixer to vortex for 1 min, so that it is fully dissolved;
11) after waiting for the temperature of the reaction flask to equilibrate, slowly dropwise adding the previously prepared potassium persulfate solution using a 10 mL syringe;
12) continuously stirring the reaction system for 18 h under the protection of argon, and then the reaction was stopped to obtain a polystyrene nanoparticle emulsion;
13) during the reaction, the liquid in the three-neck flask should gradually change from a relatively thin and bluish emulsion to a relatively thick milky white liquid;
14) after stopping the reaction, collecting a white emulsion of the product, transferring same to a dialysis bag with a molecular weight cut-off of 10 KD, performing dialysis using ultrapure water as a dialysis medium, and changing the dialysis medium at least three times to remove residual styrene and sodium dodecyl sulfonate;
15) at the end of dialysis, transferring 1.00 g of liquid into an oven to constant weight, and determining the mass concentration of polystyrene nanoparticle emulsion.

2.2 Copolymerization of Styrene with 3-Trimethoxysilylpropyl Methacrylate

Hydrophobic polystyrene nanoparticles are coated with a relatively hydrophilic polymer layer by copolymerization of styrene with 3-trimethoxysilylpropyl methacrylate. The experimental steps are as follows:

1) diluting the above-mentioned milky white emulsion with ultrapure water to a mass concentration of 10%;
2) transferring the diluted emulsion into a new 100 mL three-necked flask, connecting an Allihn condenser, an HD2010W constant-speed electric stirrer and a rubber plug at the mouth of each of the three flasks;
3) inserting a needle into the rubber plug of the three-necked flask, and introducing argon into the three-necked flask as described in 4-5) of 2.1;
4) at the same time, maintaining mechanical stirring at 400 rpm for 1 h by an HD2010W constant speed electric stirrer;
5) removing the needle on the three-neck flask, and transferring the catheter with argon gas to the Allihn condenser to keep ventilation;
6) uniformly mixing styrene and 3-trimethoxysilylpropyl methacrylate in a volume ratio of 4:1, and vortexing thoroughly in an MS2-type vortex mixer to obtain a mixed monomer solution, so that the total mass of the mixed monomer solution is equivalent to the mass of the polystyrene nanoparticles in the above-mentioned emulsion;
7) adding the resulting mixed monomer solution to the reaction flask via a 10 mL syringe and continuing to stir for 1 h;
8) subsequently, adding 2-2-Azobis 2-methyl propionitrile equivalent to 3% of the mass of the mixed monomer solution as a reaction initiator, and continuing to stir and mix for 1 h;
9) opening the HS-70 thermostatic magnetic stirrer, heating to 70° C., and stopping the reaction after 18 h to obtain MPS modified polystyrene nanoparticles;
10) after completion of the reaction, performing dialysis and constant weight as described in 13-14) of 2.1, and determining the mass concentration of MPS modified polystyrene nanoparticle emulsion;
11) according to the determined emulsion mass concentration, diluting it with ultrapure water to a mass concentration of 5% to prevent aggregation.

2.3 Synthesis of Peanuts Nanoparticles

The modified nanoparticle emulsion was further diluted to a mass concentration of 3.5%, and peanuts nanoparticles were obtained by further swelling with styrene monomer. The specific steps are as follows:
1) weighing and adding sodium 4-vinylbenzenesulfonate equivalent to 0.8% of the mass of nanoparticles into a 100 mL three-necked flask containing the nanoparticle emulsion, and stirring for 15 min to uniformly dissolve it;
2) then connecting an Allihn condenser, an HD2010W constant-speed electric stirrer and a rubber plug at the mouth of each of the three flasks;
3) inserting a needle into the rubber plug of the three-necked flask, and introducing argon into the three-necked flask as described in 4-5) of 2.1;
4) at the same time, adjusting the rotation speed of HD2010W constant speed electric stirrer to 250 rpm, and keeping mechanical stirring for 1 h;
5) taking styrene monomer equivalent to three times the volume of the nano particles and 3% by mass of 2-2-Azobis 2-methyl propionitrile to uniformly mix, and fully vortexing in an MS2-type vortex mixer and dissolving same for use as a swelling solution;
6) adding the above swelling liquid into the reaction system through a 10 mL syringe, and continuing stirring for 1 h to achieve sufficient swelling;
7) subsequently, opening the HS-70 thermostatic magnetic stirrer, heating to 70° C., and stopping the reaction after 18 h to obtain peanuts nanoparticles;
8) after completion of the reaction, collecting the precipitate by ultracentrifuge (30000 g, 30 min) and redispersing in an equal volume of anhydrous ethanol by water bath sonication, which was repeated three times to remove residual unreacted monomer and initiator.

2.4 Silica Modified Peanuts Nanoparticles Synthesis

With the different hydrophilicity of the two hemispheres of peanuts nanoparticles synthesized in the previous step, the silane hydrolysis condensation reaction only occurs on the hemisphere containing 3-trimethoxysilylpropyl methacrylate. The main steps are as follows:
1) measuring 4 mL of the nanoparticle ethanol dispersion obtained in the above reaction and placing same in a 100 mL round bottom flask;
2) adding 6 mL of anhydrous ethanol to the round bottom flask, further dilute to 10 mL, and adding 0.5 mL of 25% ammonium hydroxide solution;
3) adjusting the HS-70 thermostatic magnetic stirrer to keep stirring at a rotation speed of 500 rpm;
4) accurately weighing 0.30 g of tetraethyl orthosilicate, mixing it with an equal mass of anhydrous ethanol, and using it after fully vortexed by MS2 vortex mixer;
5) using a peristaltic pump, slowly injecting the mixture of tetraethyl orthosilicate and anhydrous ethanol into the reaction solution at a flow rate of 1 mL/h, until the mixture is completely injected, continuing to keep stirring for 1 h;

2.5 Synthesis of Nanobowl

Finally, the polymer template is removed by taking advantage of the property of polystyrene dissolving in tetrahydrofuran, resulting in nanoparticles with a bowl-like structure. The specific experimental procedures are as follows:
1) turning on the water bath of the R-200 rotary evaporator and setting the water temperature to 45° C.;
2) connecting the round bottom flask filled with the ethanol dispersion of nanoparticles after the above-mentioned reaction is finished to a rotary evaporator, adjusting the rotary speed to a medium speed, and maintaining the rotary evaporation for 1 h, so as to ensure that the ethanol is completely volatilized;
3) removing the ethanol, removing the round bottom flask, and adding an appropriate amount of tetrahydrofuran;
4) placing the round bottom flask into a water bath and sonicating for 5 min, so as to uniformly disperse the dry powder after rotary evaporation;
5) placing the round bottom flask on top of a HS-70 thermostatic magnetic stirrer and keeping under high stirring (1200 rpm) for 24 h;
6) collecting the reaction liquid and collecting the precipitate by ultracentrifuge (30000 g, 30 min) and re-dispersing in triple distilled water by water bath sonication, this process was repeated three times.

II. Calculation of the mass concentration and synthesis yield of the nanoparticle emulsion obtained in each step of the reaction is performed by performing a constant weight operation on the nanoparticle emulsion obtained in each step of the reaction:
1) selecting 3 clean 1.5 mL EP empty tubes, and recording the initial tube weight with constant oven weight;
2) accurately weighing three portions of 1.00 g each nanoparticle emulsion into a constant weight EP tube, and placing into an oven;
3) taking out the EP tube at regular intervals, weighing and recording, and then returning to the oven; after the final two times of no change in mass, the constant weight end point is reached;

4) calculating the mass of nanoparticles by subtraction weighing method, and calculating the mass concentration, and the calculation formula is as follows:

$$\text{mass concentration (\%)} = \frac{\text{constant weight nanoparticles and } EP \text{ tube total mass} - \text{constant weight } EP \text{ tube mass}}{\text{nano-particle emulsion mass before constant weight}} \times 100\%$$

5) according to the calculated mass concentration, calculating the yield of each synthesis step, and the calculation formula is as follows:

$$\text{Yield (\%)} = \frac{\text{mass concentration} - \text{total emulsion volume}}{\text{theoretical productht mass}} \times 100\%$$

III. Nanoparticle Characterization Methods
1. Nanoparticle DLS and Zeta Characterization: after the nanoparticles were ultrapure dispersed and diluted to the appropriate concentration, the light scattering particle size and Zeta potential were determined by a Malvern Zetasizer Nano ZS laser particle sizer.
2. The nanoparticle solution prepared by the key steps of the above method was diluted and then dropped onto a reinforced copper mesh, and the morphology of the nanoparticles was observed by CM-120 transmission electron microscope.
3. Estimating Opening Angle of a Nanobowl
1) The radius ratio of two hemispheres of peanuts nanoparticles ($r_1:r_2$) and the overall aspect ratio of the nanoparticles (L:W) were measured by transmission electron microscope, wherein W=2 * $r_2$.
2) According to the radius ratio and aspect ratio, calculating the opening angle of nanobowl when polystyrene is dissolved, and the calculation formula is as follows:

$$\text{opening angle } (\theta) = 2 \times \cos^{-1} \frac{r_2^2 r_1^2 \mid (Lr_2 r_1)^2}{2 \times r_2 \times (L - r_2 - r_1)}$$

IV. Results
1. Nano Particle Emulsion Mass Concentration
The concentration of each nanoparticle emulsion was calculated according to the mass concentration calculation formula, as shown in Table 4, the synthesis yield was above 85% and the synthesis efficiency was high.

TABLE 4

Mass concentration and synthesis yield of each nanoparticle emulsion

|  | Concentration (%) | Yield (%) |
|---|---|---|
| PSNPs | 17.15 | 85.80 |
| MPSNPs | 18.04 | 90.20 |
| PNPs | 12.45 | 88.93 |
| Si-PNPs | 7.34 | 91.98 |
| Nanobowls | 3.47 | — |

Figure 2:
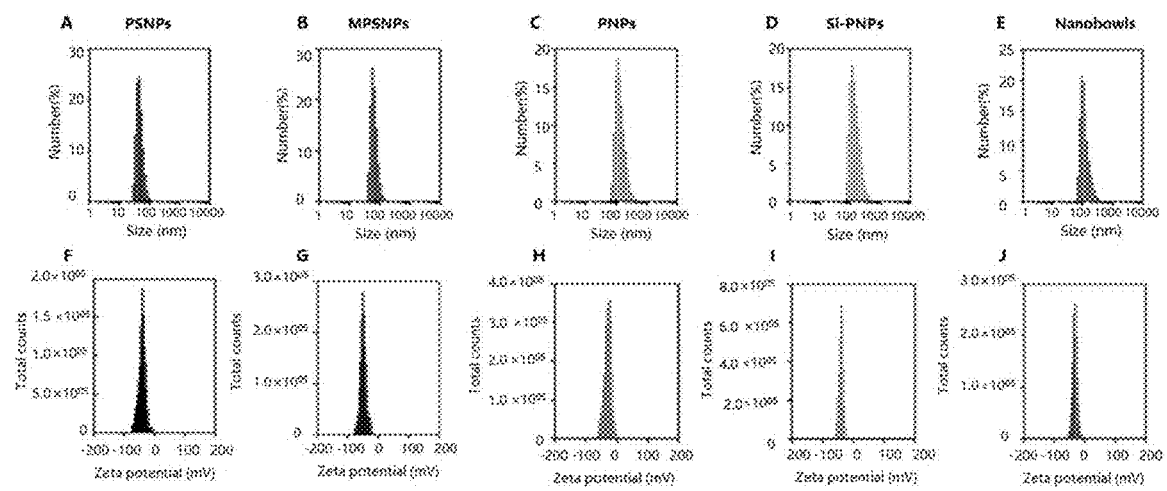
FIG. 2 is: (A-E) DLS particle size distribution diagram of polystyrene nanoparticles, MPS-coated modified polystyrene nanoparticles, peanuts nanoparticles, silica-modified peanuts nanoparticles and nanobowl, respectively; (F-J) Zeta potential profiles corresponding to polystyrene nanoparticles, MPS-modified polystyrene nanoparticles, peanuts nanoparticles, silica-modified peanuts nanoparticles, and nanobowls, respectively.

2. Nanoparticle Particle Size Distribution and Zeta Potential
The particle size distribution and Zeta potential of each nanoparticle are shown in FIG. 2: polystyrene nanoparticles were successfully synthesized by emulsion polymerization with the average size of 50.8 nm and PDI of 0.068, which indicated that the nanoparticles had good particle size uniformity and Zeta potential of −40.7 mV. Through the copolymerization of styrene and 3-trimethoxysilylpropyl methacrylate, the average size of polystyrene nanoparticles modified by MPS was 68.5 nm, and due to the effect of 3-trimethoxysilylpropyl methacrylate, it exhibits stronger negative electricity, and the Zeta potential was −49.2 mV. The modified nanoparticles were further stirred with styrene monomer, and peanuts nanoparticles were obtained by swelling and polymerization. The average size of peanuts nanoparticles was about 137.8 nm. The Zeta potential of peanuts nanoparticles increased to a certain extent due to the increase of styrene content, which was −31.6 mV. On the basis of the above, the size of nano-particles was further increased to 154.7 nm and the Zeta potential was −39.5 mV after hydrolysis and condensation reaction of slowly adding tetraethyl orthosilicate via peristaltic pump. Finally, the polystyrene template was dissolved due to the addition of tetrahydrofuran, resulting in a final product size of 126.7 nm, with a significant reduction in size from the previous silica-modified peanuts nanoparticles. At the same time, the Zeta potential remains at around −30.2 mV.

See Table 5 for the summary of specific values of particle size and Zeta potential obtained by DLS detection of nanoparticles in the above steps:

TABLE 5

Particle size and surface potential data obtained by DLS detection of each nanoparticle (n = 3)

| Nanoparticles | Size (d.nm) | PDI | Zeta potential (mV) |
|---|---|---|---|
| Polystyrene Nanoparticles (PSNPs) | 50.8 ± 0.8 | 0.068 ± 0.008 | −40.7 ± 0.9 |
| MPS coated Polystyrene Nanoparticles (MPSNPs) | 68.5 ± 3.0 | 0.078 ± 0.016 | −49.2 ± 0.4 |
| Peanuts Nanoparticles (PNPs) | 137.8 ± 5.1 | 0.066 ± 0.020 | −31.6 ± 0.1 |
| Silica Peanuts Nano-particles (Si-PNPs) | 154.7 ± 6.6 | 0.150 ± 0.012 | −39.5 ± 0.9 |
| Nanobowls | 126.74 ± 4.9 | 0.142 ± 0.013 | −30.2 ± 1.1 |

3. Transmission Electron Micrograph of Nanoparticles
The nanoparticles in the key reaction step were diluted to an appropriate concentration, and the nanoparticle dispersion was dropped on the carbon support membrane copper mesh, and after naturally drying, the sample was observed using a transmission electron microscope, and the results are shown in FIGS. 3 and 4.

Figure 3:
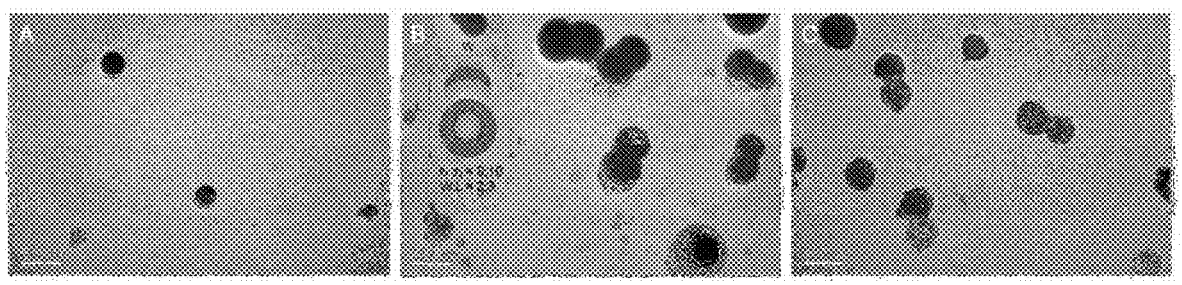
FIG. 3 is: transmission electron microscope (TEM) image of (A) polystyrene nanoparticles, (B) peanuts nanoparticles and (C) silica-modified peanuts nanoparticles.
Figure 4:
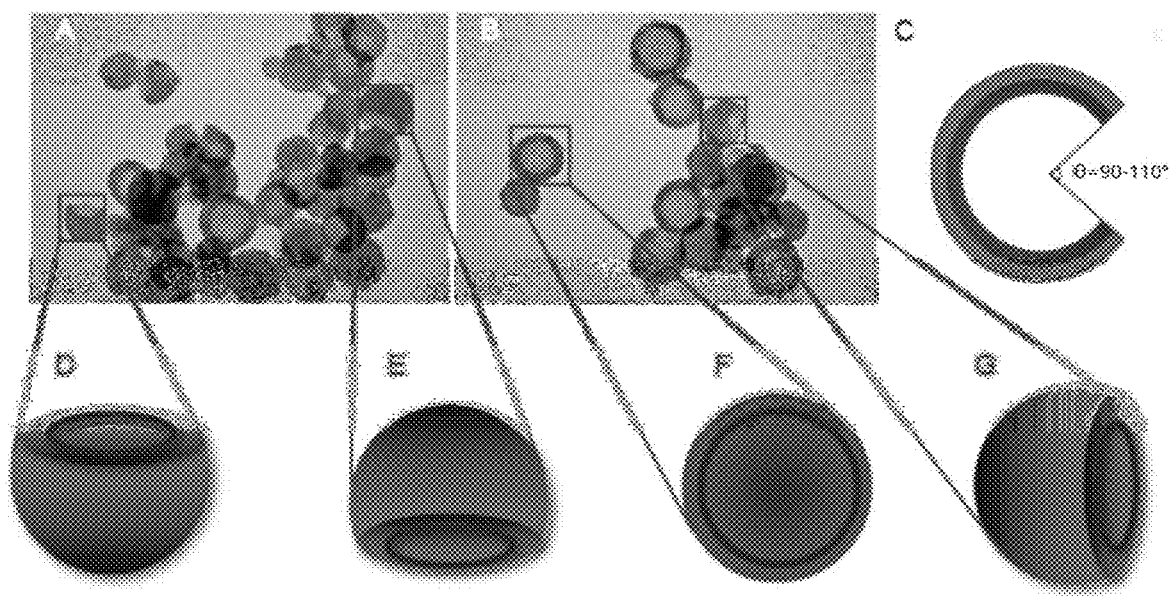
FIG. 4 is: (A, B) transmission electron micrographs of nanobowl, (C) size of opening angle of nanobowl estimated from radius and aspect ratio, (D-G) nanobowl of different angles under transmission electron microscopy.

It can be seen from FIG. 3. A that the synthesized polystyrene nanoparticles have good monodispersity and uniform size, with the size around 50 nm, which is consistent with the detection result of DLS. Because there is no obvious change in the morphology of nanoparticles and no significant increase in the size of nanoparticles during the synthesis of MPSNPs, the success of the synthesis cannot be accurately demonstrated by transmission electron microscopy. Therefore, this example does not add the corresponding TEM image any more, but the synthesis result of MPSNPs is verified through the detection of particle size and Zeta potential by DLS and the subsequent TEM image observation of nanoparticles.

As the reaction proceeds, the swelling of styrene on the basis of MPSNPs results in a significant change in the morphology of the nanoparticles, as shown in FIG. 3. B, the nanoparticles are transformed from a regular spherical shape to peanuts nanoparticles structure connected by two hemispheres. Meanwhile, it can be found that since the nanoparticles are transformed from spheres into rod-like irregularities, the particle size thereof should be measured by both the length in the longitudinal direction and the width in the transverse direction. However, in combination with the measurement results of particle size in DLS, it is easy to find that the value is closer to the longitudinal length of nanoparticles in transmission electron microscopy. It can be concluded from the transmission electron microscopy images that the lateral width of the nanoparticles grows slightly compared to the original polystyrene nanoparticles. The successful synthesis of peanuts nanoparticles and the approximation of the width of peanuts nanoparticles to polystyrene nanoparticles have been demonstrated for the successful preparation of MPSNPs.

After the introduction of TEOS, the peanuts nanoparticles are coated with silica on the hemisphere containing MPS groups. Meanwhile, since minute silica nanoparticles are silica nanoparticles are generated in the reaction environment, although the method of reducing the addition rate of TEOS by means of a peristaltic pump can effectively reduce the generation of silica nanoparticles, it cannot be completely avoided. When the tiny silica nanoparticles are reacted with the peanuts nanoparticles again, the unsmooth appearance of the surface of the silica-modified peanuts nanoparticles results, as shown in FIG. 3. C, which is more rough than FIG. 3. B, and tiny protrusions of the surface can be observed.

Finally, when polystyrene was dissolved by tetrahydrofuran, one hemisphere of the original peanuts nanoparticles disappeared clearly under transmission electron microscope, and the nanoparticles transformed into a sphere. It is noteworthy that the center of the remaining half of the sphere has a significantly lower electron density than the periphery, showing a shallower off-white color than the periphery, suggesting that the center of the sphere has also been hollowed out, leaving only the silica shell formed by the hydrolytic condensation of TEOS. Moreover, from the images of the transmission electron microscope, the nanobowl with different opening orientations can be clearly observed (FIG. 4). All of the above evidences demonstrate the successful synthesis of nanobowl.

4. Radius ratio, aspect ratio and nanobowl opening angle of peanuts nanoparticles 1) Radius Ratio and Aspect Ratio of Peanuts Nanoparticles By measuring the length, width and radius length of two hemispheres of peanuts nanoparticles through transmission electron microscopy, the calculation results are r1:r2 is about 9:10, L:W is about 3:2.

2) Nanobowl Opening Angle

According to the length, width and radius length of two hemispheres of the peanuts nanoparticles obtained by the above-mentioned measurement, the opening angle (0) of the nanobowl is calculated to be in the range of 90°-110° by using the opening angle calculation formula.

V. Discussion

1. Selection and Control of Polystyrene Nanoparticle Size

Figure 5:
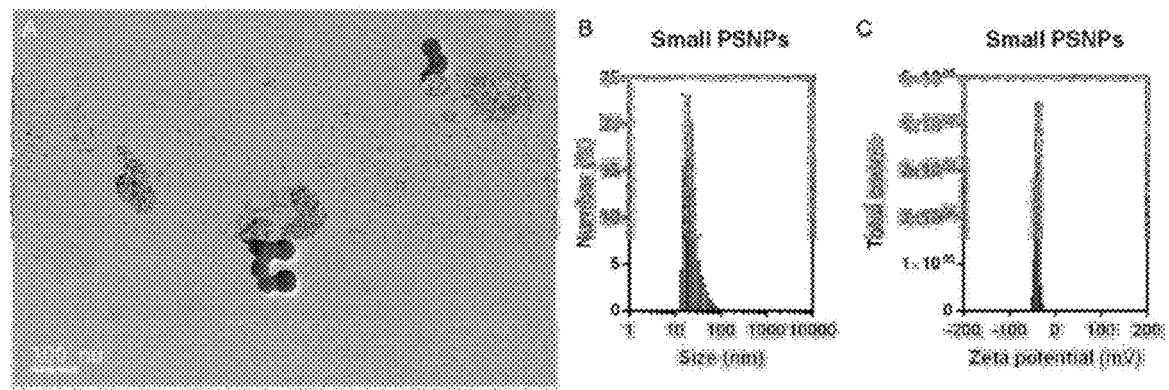
FIG. 5 is: (A) transmission electron micrographs of small-sized polystyrene nanoparticles, (B) and (C) particle size distribution diagram and Zeta potential of small-sized polystyrene nanoparticles respectively.

As a seed template in the preparation, the subsequent reactions should be carried out on the basis of the completion of polystyrene nanoparticles. Therefore, the preparation of polystyrene nanoparticles will directly affect the success of the subsequent reactions, and the synthesis of high-quality polystyrene nanoparticles is particularly important. Since the subsequent reaction requires a single polystyrene nanoparticle as a template, there is a high demand for homogeneity and monodispersity of polystyrene nanoparticles. Any sticking or agglomeration may affect the subsequent reactions, leading to changes in the final nanoparticle properties, morphology, or even synthesis failures. At the same time, the size selection of the polystyrene nanoparticles will also affect the overall size of the final nanobowl and the volume of the inner water cavity. According to the EPR effect theory, polystyrene nanoparticles in the range of 30-50 nm were selected as the seed template, and through multi-step reaction, the final nanobowl with the overall size of about 100 nm and 30-50 nm diameter inner water cavity was obtained. According to the characteristics of emulsion polymerization, the changing the amount of emulsifier SDS, the volume of emulsion droplets in the reaction system can be changed, thus affecting the volume of styrene coated in emulsion droplets, finally determining the size of polystyrene nanoparticles. Attempts have been made herein to select two different SDS loadings (1 g, 2 g) to synthesize polystyrene nanoparticles of different sizes. It was found that when the amount of SDS was increased, the size of polystyrene nanoparticles was significantly reduced to around 30 nm. DLS results showed 38.74±12.7 nm and Zeta potential was −40.9±3.1 mV, while PDI results showed 0.372±0.008. At the same time, the polystyrene nanoparticles showed obvious agglomeration and blocking observed by transmission electron microscopy (FIG. 5). From both PDI and TEM results, it was proved that the size of polystyrene nanoparticles could be reduced by increasing the amount of SDS, but the surface energy of nanoparticles increased significantly due to the decrease of the size, which resulted in the stability of nanoparticles decreased significantly and the aggregation of nanoparticles was easy to occur. Therefore, after consideration, polystyrene nanoparticles with a size of 50 nm are finally selected as a seed template for subsequent reactions.

2. Swelling of Styrene and Principle of Peanuts Nanoparticles Synthesis

Premature mixing agitation time of styrene monomer with MPS modified polystyrene nanoparticles is critical in swelling. The volume expansion of the polystyrene nanoparticles located in the center of the MPS-modified polystyrene nanoparticles can only be caused by the penetration of the styrene monomer into the MPS-modified polystyrene nanoparticles by stirring for a sufficient time. The volume expanded core polystyrene nanoparticles gradually burst the coating shell of the copolymer of MPS and styrene to form a gap. Subsequently, by increasing the temperature of the reaction system, the under the initiation of AIBN, the remaining styrene monomer in the reaction system will rapidly undergo explosive polymerization at the notch, forming another hemisphere of peanuts nanoparticles at the notch. It should be noted that during the polymerization reaction, since the styrene monomer cannot sufficiently react with the MPS due to the hydrophobicity of styrene and the hydrophilicity of MPS, while the polystyrene at the notch has the same hydrophobicity as the styrene monomer, the styrene monomer tends to rapidly polymerize at the notch according to the similar solvation principle.

3. Styrene Swelling Ratio and Peanuts Nanoparticles Hemispherical Size Control

Figure 6:
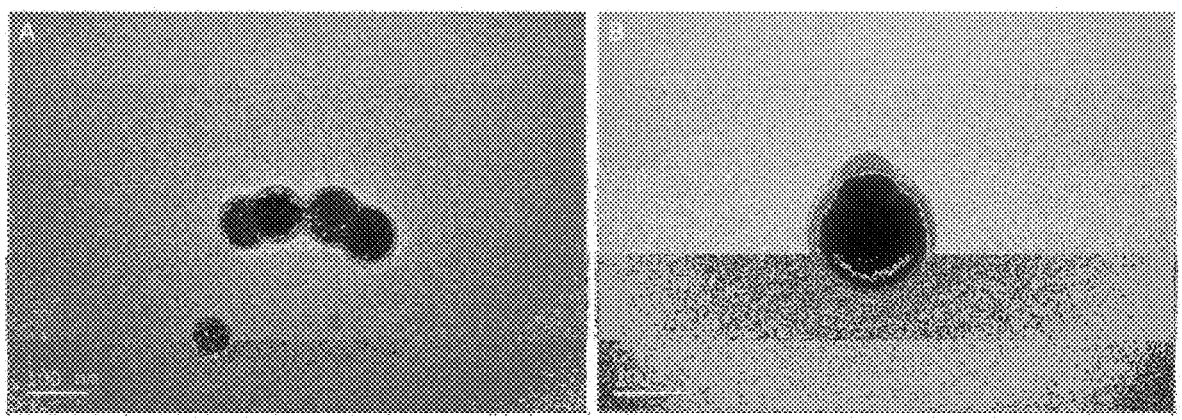
FIG. 6 is: (A) transmission electron micrographs of peanuts nanoparticles synthesized at a feed ratio of 3:1 and (B) transmission electron micrographs of peanuts nanoparticles synthesized at a feed ratio of 9:1.

By adjusting the amount of styrene monomer added, the size of one of the hemispheres of peanuts nanoparticles produced by swelling can be regulated. In this paper, two different feed ratios of styrene monomer and MPS modified polystyrene nanoparticles, 3:1 and 9:1, were chosen to verify the above argument. The results are shown in transmission electron microscopy of FIG. 6 when the feed volume ratio of styrene monomer to MPS modified polystyrene nanoparticles ($V_{styrene}:V_{MPSNPs}$) is 3:1, the two hemispheres of the synthesized peanuts nanoparticles are comparable in size (FIG. 6. A). And when Vstyrene:VMPSNPs is increased to 9:1, the two hemispheres of the synthesized peanuts nanoparticles are very different in size (FIG. 6. B), the smaller hemisphere is the original MPS-modified polystyrene nanoparticle, while the other hemisphere is significantly increased in size due to the increase in styrene monomer, up to 200 nm in diameter, four times the size of the smaller hemisphere. In view of the need to deduct polystyrene for subsequent reactions, too much polystyrene proportion may lead to incomplete final dissolution process, thereby affecting the synthesis of the final nanobowl. Therefore, a feed ratio of $V_{styrene}$ $V_{MPSNPs}$ 3:1 was used as a scheme for the final synthesis of peanuts nanoparticles.

4. Selective Hydrolysis and Condensation of TEOS and Control of Flow Rate

After successful synthesis of peanuts nanoparticles, TEOS is added to perform a hydrolytic condensation reaction. Since the synthetic peanuts nanoparticles are not only particularly shaped, the surface groups of the two hemispheres are completely different. As a result of the addition of MPS, one hemisphere of the peanuts nanoparticles contains silanol groups, and the other hemisphere formed later is polymerized from a simple styrene monomer, with only the olefinic bonds of styrene on the surface and no silanol groups. Thus, TEOS undergoes a hydrolytic condensation reaction with silanol groups on MPS via the Stoeber reaction under alkaline conditions of ammonia. The absence of silanol groups on the other hemisphere precludes the hydrolytic condensation reaction to selectively modify the silica over the MPS containing hemisphere. It should be noted that TEOS can itself hydrolytically condense under the catalysis of ammonia to form silica nanoparticles. To reduce the probability of hydrolytic condensation of TEOS itself, the proper TEOS addition rate is a very critical factor. By reducing the TEOS addition rate as much as possible, the additional TEOS reacts rapidly with the peanuts nanoparticles, thereby reducing the formation of silica nanoparticles due to their self-condensation. However, although this operation can reduce the probability of silica nano-generation, it is still inevitable that minute silica nanoparticles are formed and condensation with peanuts nanoparticles continues in the form of minute silica nanoparticles. Thus, there is the phenomenon described above that the surface of silica-modified peanut nanoparticles is not smooth and flat.

5. TEOS Dosage and Nanobowl Morphology

Figure 7:
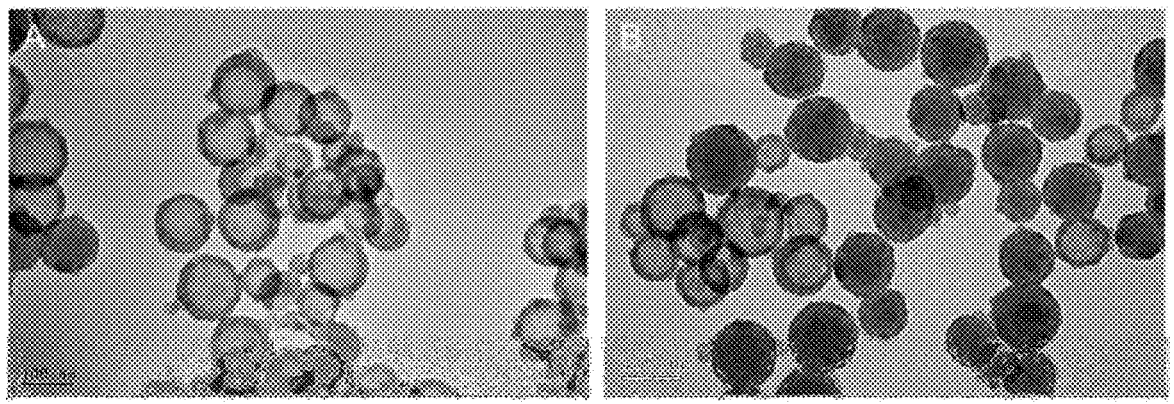
FIG. 7 is: (A) a nanobowl transmission electron micrograph synthesized with 0.3 g of TEOS, (B) a nanobowl transmission electron micrograph synthesized with 0.5 g of TEOS.

Finally, this example also examined the relationship between the amount of TEOS charged and the morphology of the nanobowl. The final nanobowl was prepared by adding 0.3 g TEOS and 0.5 g TEOS, respectively. The nanobowl was dropped on the copper mesh, and the morphology of nanobowl was observed by transmission electron microscopy. As shown in FIG. 7. A, when the TEOS dosage was 0.3 g, the silica layer on the surface of the nanoparticles could be clearly observed, while the structure of the bowl mouth and bowl wall could be clearly distinguished. However, when the TEOS dosage is increased to 0.5 g, the probability of self-hydrolytic condensation is also significantly increased due to the increase of TEOS, and the generation of silica nanoparticles is also significantly increased while forming the nanobowl, as shown in FIG. 7. B, which shows a large increase in the proportion of solid silica nanoparticles compared to FIG. 7. A. Therefore, in order to obtain more nanobowl, 0.3 g of TEOS was chosen as the final for preparing silica-modified peanuts nanoparticles.

VI. Summary

Construction method of nanobowl: polystyrene nanoparticles were synthesized from styrene monomer by emulsion polymerization; then adding MPS/styrene mixed solution in a certain proportion to prepare MPS modified polystyrene nanoparticles by copolymerization; on this basis, styrene monomer was added again, and peanuts nanoparticles were obtained by using the swelling property and polymerization reaction of styrene; transferring the prepared peanut-shaped nanoparticles into anhydrous ethanol to be uniformly dispersed, then adding TEOS, and selectively performing a Stöeber reaction with a hemisphere containing an MPS group in an alkaline environment of Ammonium hydroxide solution to form silica-modified peanut-shaped nanoparticles; finally, by taking advantage of the property that polystyrene is dissolved in tetrahydrofuran, the polystyrene component in the nanoparticles is dissolved, leaving only the shell containing silica, thereby obtaining nanoparticles having a bowl-like structure. The average particle size of the nanobowl was 126.7 nm, the Zeta potential was −30.2 mV, the PDI was 0.142, and the nanobowl had uniform size and good monodispersity. The morphology of nanobowl was confirmed by TEM; from the radius ratio and aspect ratio of the nanoparticles, the opening angle of the nanobowl was estimated to range from 90° to 110°.

EXAMPLE 2

Preparation of Nanobowls@Liposomes and Establishment of Drug Loading Method

In this example, liposomes were attached to the nanobowl prepared in Example 1 by means of electrostatic adsorption by means of probe sonication. Subsequently, the ammonium sulfate gradient method was used for active drug loading to complete the loading of the weakly basic drug doxorubicin with high encapsulation efficiency, and the nanobowls@Dox-liposome was obtained.

Figure 8:
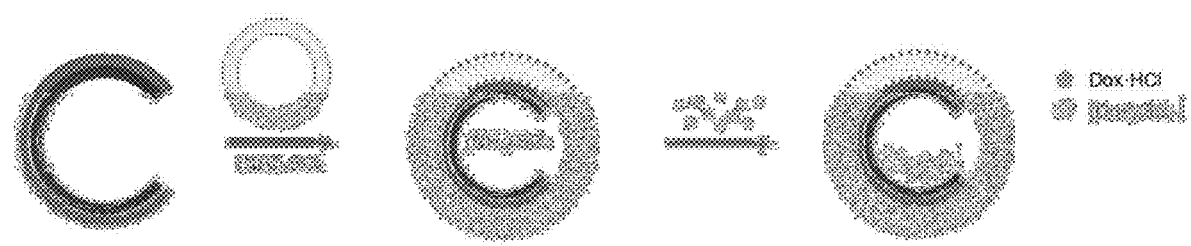
FIG. 8 is a schematic diagram of a synthetic route for nanobowls@Dox-liposomes.

A schematic diagram of a specific synthetic scheme is shown in FIG. 8. I. Preparation of nanobowls@liposomes 1 Instruments and Materials 1.1 Instruments and Equipment

TABLE 6

| | |
|---|---|
| XS205s electronic balance | METTLER TOLEDO |
| JY92-II ultrasonic cell disruptor | Ningbo SCIENTZ Biotechnology Co. Ltd. |
| HS-70 thermostatic magnetic stirrer | IKA, Germany |
| R-200 rotary evaporator | Buchi, Switzerland |
| Vacuum drying oven | Shanghai Yiheng Technology Instrument Co. Ltd. |
| Mini-extrusion device | Avanti Company, USA |
| Sorvall ST 16 frozen centrifuge | ThermoFisher, USA |
| CM-120 transmission electron microscope | Philips, Netherlands |
| Malvern Zetasizer Nano ZS laser particle sizer | Malvern Company, British |
| SpectraMax M2 Biomolecular mcroplate reader | Molecular Devices, USA |
| ZQTY-70 oscillating incubator | Shanghai Zhichu Instrument Co. Ltd. |

TABLE 6-continued

| | |
|---|---|
| RLPHR 2-4 LD freeze dryer | Marin Christ, inc., USA |
| MS2 vortex mixer | IKA, Germany |
| Laboratory ultrapure water system | Millipore Company, USA |

1.2 Materials and Reagents

TABLE 7

| | |
|---|---|
| APTES | Sigma Inc. USA |
| Cholesterol | Sigma Inc. USA |
| HSPC | Avanti Company, USA |
| DSPE-PEG2000 | Avanti Company, USA |
| G-50 dextran gel | GE Corp. USA |
| DiR | ThermoFisher, USA |
| doxorubicin hydrochloride | Beijing Huafeng Lianbo Technology Co. Ltd. |
| Trichloromethane | Sinopharm Chemical Reagent Co. Ltd. |
| Ammonium sulfate | Sangon Biotech (Shanghai) |
| Sodium hydroxide (AR grade) | Sinopharm Chemical Reagent Co. Ltd. |
| Methanol | Sinopharm Chemical Reagent Co. Ltd. |
| Uranyl acetate | Beijing Zhongjingkeyi Technology Co., Ltd |
| Anhydrous ethanol | Sinopharm Chemical Reagent Co. Ltd. |
| Hydrochloric acid | Sinopharm Chemical Reagent Co. Ltd. |
| Glycine | Sangon Biotech (Shanghai) |
| Triton X-100 | Sangon Biotech (Shanghai) |
| 3.5 KD dialysis membrane | Sangon Biotech (Shanghai) |

2 Experimental Method
2.1 Amination Modification of Nanobowl
1) transferring 20 mg of the nanobowl ultrapure water dispersion prepared above and dispersing into 10 mL anhydrous ethanol by ultracentrifugation (30000 g, 30 min);
2) adding the anhydrous ethanol dispersion containing the nanobowl into a 25 mL round bottom flask and stirring at a constant speed;
3) transferring 200 μL of APTES to the above dispersion and keeping stirring at 150 rpm overnight;
4) after completion of the reaction, taking out the reaction solution, removing unreacted APTES by centrifugation (24000 g, 30 min), collecting the precipitate and re-dispersing in 5 mL of ultrapure water, and this process was repeated 3 times;
5) measuring nanoparticle particle size and potential by DLS.

2.2 Preparation of Nanobowls@Liposomes
1) accurately weighing 25 mg of cholesterol, HSPC and DSPE-PEG2000, respectively, dissolving them in 1 mL of trichloromethane to prepare 25 mg/mL lipid solution;
2) fully dissolving 10 mg of DiR in 1 mL of trichloromethane;
3) with mass ratio of HSPC:Chol:DSPE-PEG2000=3:1:1 (if DiR-containing liposomes were prepared according to mass ratio of HSPC:Chol:DSPE-PEG2000:DiR=3: 1:1:0.05), transferring an appropriate amount of the above solution, so that the total mass of lipid is 20 mg, adding an appropriate amount of trichloromethane, diluting to 5 mL, and uniformly mixing the solution by MS2 vortex mixer;
4) preparation of liposomes by thin film dispersion: adding the well-mixed lipid solution into a 500 mL round-bottom flask, connecting it to a rotary evaporator, adjusting the medium rotation speed, water temperature to 40° C., and performing rotary evaporation for 1 h to remove trichloromethane, so that the lipid uniformly covers the bottom of the round-bottom flask;
5) removing the round bottom flask and putting it into a vacuum drying oven to dry overnight;
6) preparing 300 mM of ammonium sulfate solution at pH 5.5: accurately weighing 7.93 g of ammonium sulfate, and fully dissolving it in 200 mL of ultrapure water; adjusting the pH to 5.5 by 1 M sodium hydroxide solution;
7) transferring the aminated nanobowl synthesized in 2.1 into the prepared ammonium sulfate solution by centrifugal means (24000 g, 30 min);
8) adding the ammonium sulfate solution containing the aminated nanobowl into the round bottom flask after drying overnight, placing same into a ZQTY-70 shaking incubator to shake (250 rpm, 60° C.) for 1 h, so that the lipid is fully hydrated, forming vesicles coated with the nanobowl;
9) fixing the suspension of liposome vesicles obtained above on a JY92-II ultrasonic cell pulverizer, and subjecting to probe ultrasound for 30 min at a power of 35 W and a mode of 15-second operation and 15-second pause to prepare uniformly dispersed nanobowls@liposomes.

2.3 Preparation of Common Liposomes
1) preparing film dispersion of lipid is according to 1)-6) in 2.2;
2) transferring 5 mL of the prepared ammonium sulfate solution into the round bottom flask after drying overnight, placing same into a ZQTY-70 shaking incubator to shake (250 rpm, 60° C.) for 1 h, so that the lipid is fully hydrated, forming vesicle suspension;
3) assembling a liposome mini-extrusion device, installing a PC membrane with pore size at 200 nm, and the resulting vesicle suspension was extruded back and forth through the extrusion device 20 times to improve liposome size uniformity.

2.4 Encapsulation of Doxorubicin Hydrochloride
1) preparing 10% sucrose dialysate containing 10 mM histidine at pH 6.5: weighing 500 g of sucrose, dissolving in 5 L of ultrapure water, adding 7.75 g of histidine, and fully dissolving it; adjusting the pH to 6.5 by 1 M hydrochloric acid solution;
2) cutting two sections of 3.5 KD dialysis membranes, respectively adding the nanobowls@liposomes and the common liposome prepared in the previous step, and placing the two into a 1 L beaker containing sucrose dialysate for dialysis, during which 4 times of liquid changes are performed;
3) accurately weighing 2.0 mg doxorubicin hydrochloride and dissolving it in 1 mL sucrose dialysate;
4) adding 0.5 mL of 2 mg/mL doxorubicin hydrochloride sucrose solution into the two groups of liposomes after dialysis, blowing and beating for several times to fully mix;
5) placing the mixture of two groups of liposomes and doxorubicin hydrochloride into ZQTY-70 shaking incubator (250 rpm, 60° C.) for 1 h;
6) placing the nanobowl in a centrifuge to support the liposome, collecting the precipitate by centrifugation (24000 g, 30 min), redispersing with 10% sucrose dialysate, repeating the washing for three times, and removing free doxorubicin hydrochloride and the liposome without encapsulated nanobowl; dropping ordinary Dox-liposomes onto G-50 dextran gels to elute free doxorubicin hydrochloride.

II. Establishment of Fluorescence Quantitative Analysis Method for Doxorubicin Hydrochloride 1. Selection of Detection Wavelength
   1) weighing 1 mg doxorubicin hydrochloride and dissolving it in 10 mL of ultrapure water;
   2) transferring 200 μL of sampleinto a 96-well plate;
   3) obtaining the ultraviolet absorption spectrum of doxorubicin hydrochloride by ultraviolet absorption scanning in the range of 200-850 nm with SpectraMax M2 Biomolecular microplate reader;
   4) determining the maximum absorption wavelength (Dox-max) of doxorubicin hydrochloride by ultraviolet absorption spectroscopy, and detecting the fluorescence emission spectrum of doxorubicin hydrochloride with this wavelength as excitation wavelength, and the maximum fluorescence emission wavelength (Em Dox-max) of doxorubicin hydrochloride was obtained.

2. Plotting of Standard Curve
   1) accurately weighing an appropriate amount of doxorubicin hydrochloride, using ultrapure water to prepare the stock solution with a certain concentration, and then continuing to use ultrapure water to dilute the stock solution to prepare the reference solution of doxorubicin hydrochloride of 0.156, 0.313, 0.625, 1.250, 2.500, 5.000 and 10.000 μg/mL;
   2) according to the Dox-max and Em Dox-max obtained by the above-mentioned method, establishing a fluorescence quantitative analysis detection method: with Dox-max as the excitation light wavelength, detecting the fluorescence emission intensity of the above-mentioned reference solution of doxorubicin hydrochloride with various concentrations at Em Dox-max wavelength;
   3) obtaining the fluorescence standard curve equation of doxorubicin hydrochloride by linear regression of fluorescence emission intensity versus doxorubicin hydrochloride concentration.

3. Precision
   1) selecting the above 0.156, 1.250 and 10.000 μg/mL doxorubicin hydrochloride reference solutions as low, medium and high concentration samples, respectively;
   2) detecting the fluorescence intensity of doxorubicin hydrochloride at 2, 4 and 8 h to calculate the intra-day standard deviation (RSD Intra-day); detecting on 1d, 2d and 3d, and calculating the inter-day standard deviation (RSD Inter-day).

4. Recovery Rate
   1) selecting 3 portions of the above-mentioned 0.156, 1.250 and 10.000 μg/mL reference solution of doxorubicin hydrochloride to detect the fluorescence intensity;
   2) putting the obtained fluorescence intensity into the standard curve formula, and calculate the determined concentration of doxorubicin hydrochloride;
   3) calculating the recovery rate from the determined concentration and the actual concentration.

III. Nano-Particle Dual-Fluorescence Qualitative Detection

1. Selection of DiR Detection Wavelength
   1) transferring 20 μL of 10 mg/mL DiR trichloromethane solution and diluting to 1 mL with methanol;
   2) transferring 200 μL of sampleinto a 96-well plate;
   3) obtaining the ultraviolet absorption spectrum of DiR by ultraviolet absorption scanning in the range of 200-850 nm with SpectraMax M2 Biomolecular microplate reader;
   4) the maximum absorption wavelength DiR-max of DiR was determined by ultraviolet absorption spectroscopy, and the excitation wavelength was selected as the wavelength that has the least influence on the fluorescence spectrum in the ultraviolet absorption region of DiR. The fluorescence emission spectrum of DiR was detected, and the maximum fluorescence emission wavelength Em DiR-max of DiR was obtained.

2. Nanoparticle Ultraviolet Absorption Spectrum and Dual Fluorescence Signal Emission Spectrum
   1) transferring an appropriate amount of nanobowls@liposomes loaded with doxorubicin and embedded with DiR in a liposome phospholipid bilayer or a common Dox-liposome, respectively, and adding same into a corresponding 96-well plate;
   2) obtaining the ultraviolet absorption spectrum of nanoparticle by ultraviolet absorption scanning in the range of 200-850 nm with SpectraMax M2 Biomolecular microplate reader;
   3) then, according to the above mentioned method, selecting of the maximum absorption wavelength of Dox-max and DiR of doxorubicin hydrochloride which has the least influence on the fluorescence spectrum as the excitation light wavelength, to detect the fluorescence emission spectra of the doxorubicin hydrochloride and DiR in the nanoparticles.

IV. Determination of Liposome Encapsulation Rate and Drug Loading
   1) accurately transferring 50 μL of doxorubicin loaded nanobowl-supported @liposomes or common Dox-liposome sample, diluting to 1 mL by ultrapure water;
   2) adding 0.2% Triton solution into the sample, so that the liposome is lysed to release doxorubicin in the inner water cavity;
   3) detecting the fluorescence intensity of doxorubicin by fluorescence quantitative analysis;
   4) taking the fluorescence intensity into the standard curve equation to obtain the doxorubicin concentration, and calculating the encapsulation rate. The specific formula is as follows:

$$\text{encapsulation rate (\%)} = \frac{\text{fluorescence quantitative detection of drug concentration} \times \text{dilution ratio} \times \text{sample total volume}}{\text{theoretical feed quantity}} \times 100\%$$

5) accurately transferring 1 mL of nanobowls@Dox-liposome or common Dox-liposome sample, loading into constant weight treated EP tube, placing into −80° C. refrigerator for overnight freezing, and then transferring to RLPHR 2-4 LD freeze dryer for freeze drying.
   6) weighing the freeze-dried sample and calculating the drug loading:

$$\text{drug loading (\%)} = \frac{\text{drug concentration} \times \text{volume}}{\text{EP tube mass after freeze drying} - \text{empty EP tube mass after freeze drying}} \times 100\%$$

V Results
1. Characterization of Amination Modification of Nanobowl

Figure 9:
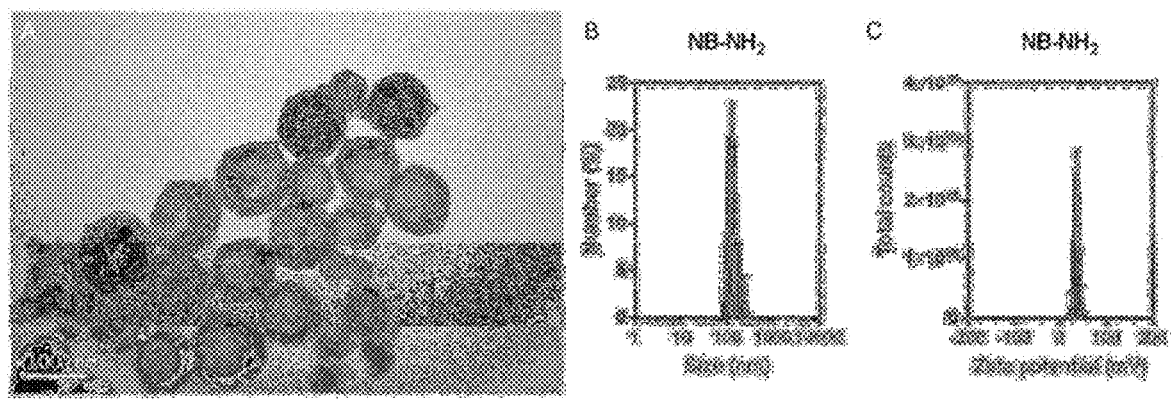
FIG. 9 is: (A) transmission electron micrographs of the aminated nanobowl, (B, C) particle size distribution and Zeta potential of the aminated nanobowl, respectively.
Figure 10:
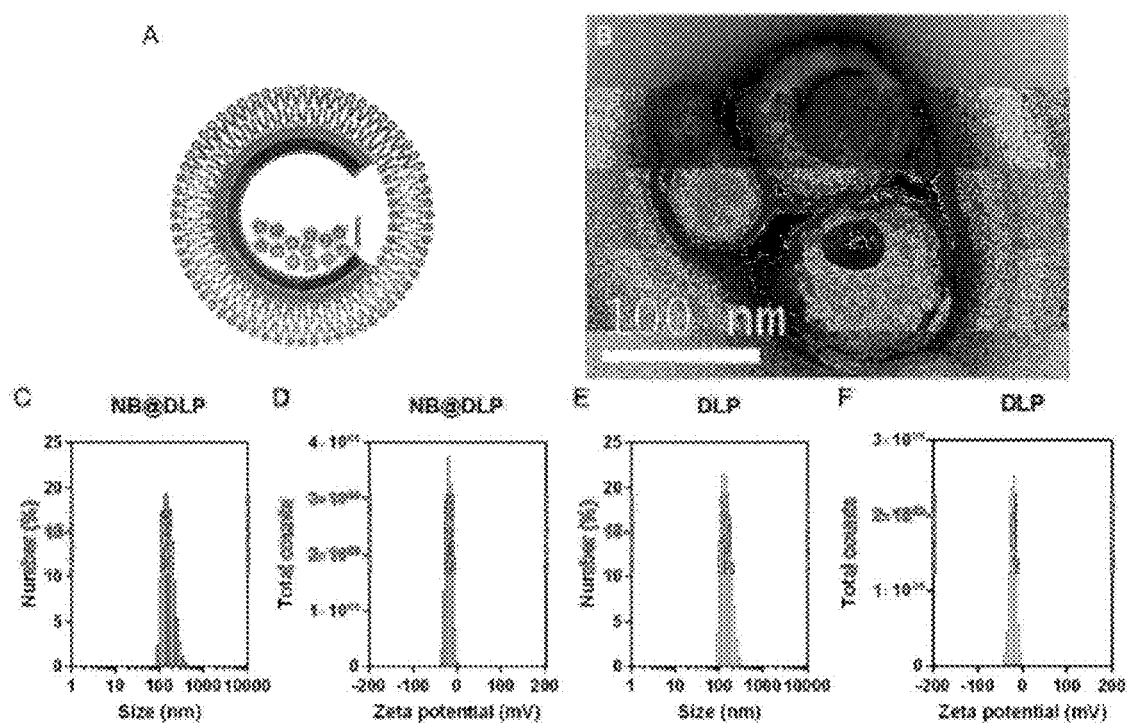
FIG. 10 is: (A) pattern diagram of nanobowls@liposomes, (B) transmission electron micrographs of nanobowls@liposomes, (C, D, E, F) particle size distribution and Zeta potential of nanobowls@liposomes and common liposomes, respectively.

After amination, DLS results showed no significant change in the size of the nanobowl, but its Zeta potential was reversed from the original −30.2±1.1 mV to +34.5±1.5 mV, as shown in FIG. 9. C. The inversion of the potential confirms that the surface of the nanobowl has been successfully modified with amino groups, which makes the Zeta potential of the nanobowl positive. At the same time, FIG. 9. A TEM results show that the morphology of nanoparticles is not changed and the bowl-like structure is not affected.

2. Characterization of Nanobowls@Liposomes and Common Liposomes

Through the addition of liposomes, DLS measurements showed that the nanobowls@liposomes size increased to 143.6±6.2 nm, which was nearly 20 nm in comparison to the nanobowl size. Meanwhile, the Zeta potential results showed −17.9±0.3 mV. The particle size of common liposomes extruded through a 200 nm PC membrane was 148.3±2.9 nm and the Zeta potential was −20.3±1.2 mV. The nanobowl supports the slight increase in liposome particle size and the re-inversion of Zeta potential and approximates normal liposomes. Subsequently, a ring of phospholipid bilayer around the nanobowl was clearly observed by transmission electron microscopy of uranyl acetate negatively stained nanoparticle samples, while the nanobowl encapsulated in liposomes was still clearly visible. These phenomena all confirm successful encapsulation of the liposomes.

Figure 11:
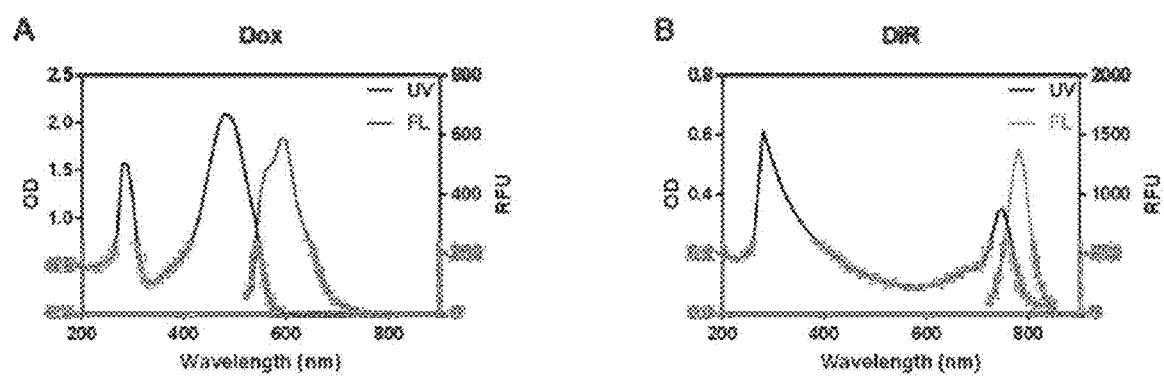
FIG. 11 is: (A) UV absorption and fluorescence spectra of doxorubicin hydrochloride, (B) UV absorption and fluorescence spectra of DiR probe.

3. Ultraviolet Absorption Spectrum and Fluorescence Spectrum 3.1 Doxorubicin Hydrochloride and DiR Ultraviolet Absorption Spectrum and Fluorescence Spectrum According to the results of wavelength scanning of microplate reader, respectively draw the ultraviolet absorption spectrum of doxorubicin hydrochloride and DiR. The results are shown in FIG. 11. Dox-max=480 nm, DiR-max=740 nm. Then 480 nm and 700 nm are taken as the excitation wavelengths of the two, respectively, and the corresponding fluorescence emission spectra are obtained using a microplate reader, Em Dox-max=580 nm, Em DiR-max=780 nm.

3.2. Nanoparticle UV Absorption and Dual Fluorescence Emission Spectra

Figure 12:
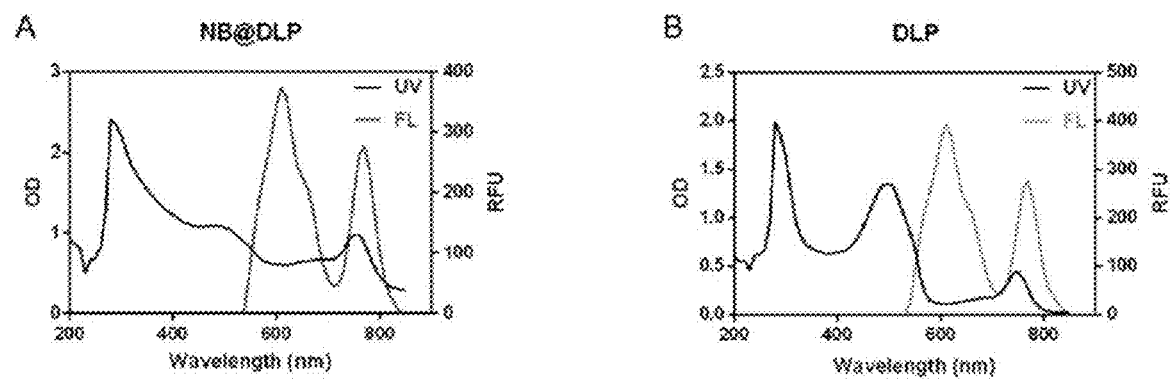
FIG. 12 is: (A) UV absorption and fluorescence spectra of Dox-liposome nanobowls@Dox-liposomes, and (B) UV absorption and fluorescence spectra of common Dox-liposome.

The UV absorption and fluorescence signals of the prepared two kinds of liposomes were determined, and the results are shown in FIG. 12. Whether the UV absorption spectrum or fluorescence emission spectrum, the characteristic absorption and emission peaks of doxorubicin hydrochloride and DiR could be found, indicating the simultaneous existence of doxorubicin and liposome in the system, proving the successful encapsulation of doxorubicin. By carefully comparing the UV absorption spectra of NB@DLP and DLP, it can be found that the absorption of NB@DLP is significantly higher than that of DLP at the wavelength range of 300-400 nm, which is supposed to be the non-characteristic absorption region of nanobowl.

4. Determination of Nanoparticle Encapsulation Rate and Drug Loading 4.1. Doxorubicin Hydrochloride Fluorescent Quantitative Standard Curve According to the results detected by microplate reader, the fluorescence light intensity at 580 nm wavelength was recorded for each concentration of doxorubicin hydrochloride, and linear regression was performed with fluorescence intensity RFU versus concentration C (μg/mL) to obtain RFUDox=99.11C-9.871, $R^2$=0.998. At the same time, the precision and recovery method were investigated, and the results were shown in Tables 8 and 9. The RSD of intra-day and inter-day precisions were less than 3%, indicating that the precision of this method was good.

TABLE 8

Precision experiment

| Concentration (ug/mL) | RSD (%) | |
|---|---|---|
| | RSD Intra-day | RSD Inter-day |
| 0.156 | 1.88 | 2.42 |
| 1.250 | 2.93 | 1.14 |
| 10.000 | 0.64 | 1.78 |

TABLE 9

Recovery experiments

| Concentration (μg/mL) | Recovery (%) | | | Mean (%) | RSD (%) |
|---|---|---|---|---|---|
| | 1 | 2 | 3 | | |
| 0.156 | 103.89 | 98.85 | 101.23 | 101.32 | 2.49 |
| 1.250 | 97.86 | 100.33 | 97.38 | 98.52 | 1.61 |
| 10.000 | 100.17 | 99.54 | 99.08 | 99.60 | 0.55 |

4.2. Determination of Nanoparticle Encapsulation Rate and Drug Loading

The fluorescence intensity of doxorubicin hydrochloride in Hydrochloride in the nanoparticles was determined by microplate reader, substituted into the fluorescence quantitative analysis standard curve of doxorubicin hydrochloride, and the concentration of doxorubicin hydrochloride in the corresponding nanoparticles was obtained. The drug loading and encapsulation efficiency were calculated as shown in Table 10. The results showed that the loading efficiency of liposomes was not significantly affected by the presence or absence of nanobowl support, and the entrapment efficiency was maintained at about 90%.

TABLE 10

Nanoparticle encapsulation rate and drug loading (n = 3)

| Sample | Encapsulation efficiency (%) | Drug loading (%) |
|---|---|---|
| DLP | 91.53 ± 0.67 | 4.64 ± 0.71 |
| NB@DLP | 89.57 ± 0.66 | 2.34 ± 0.37 |

VI. Discussion
1. Influence of Zeta Potential and Particle Size of Nanobowl on Liposome Fusion Encapsulation The encapsulation of nanoparticles into liposomes is a result of many factors. The Zeta potential and the Zeta potential and the size of the nanoparticles affect the final fusion results. Electrostatic adsorption plays an important role in the coating process of nanoparticles and liposomes. When the Zeta potential of the liposome is negative, if the Zeta potential of the nanoparticle is opposite positive, the liposome and the nanoparticle will rapidly approach and adsorb under the action of the electrostatic adsorption force, and finally the nanoparticle and the liposome fuse and enter into the water cavity of the liposome; however, when the Zeta potential of the nanoparticle is also negatively charged, due to the same electrical property between the nanoparticle and the liposome, the rapid increase of the electrostatic repulsive force when the two are close may result in the failure of the two to close, thus hindering the fusion of the nanoparticle and the liposome. At the same time, the size of the nanoparticles will also influence the fusion with the liposomes. When the size of the nanoparticles is much smaller than that of the liposomes, although the opposite electrical property can promote the approach and adsorption of the nanoparticles to the liposomes, due to the undersize of the nanoparticles, the surface potential thereof is insufficient to enable the fusion thereof with the liposomes; on the contrary, a large number of small nanoparticles exist on the surface of the liposomes, and at the same time, these small nanoparticles can continue to adsorb other liposomes, thereby forming crosslinks to destroy the dispersion balance of the nanoparticles, and finally causing sedimentation; when the size of the nanoparticle is comparable to that of the liposome, the surface potential will be sufficient to initiate fusion of the nanoparticle with the liposome to form a stable association.

2. Selection of Doxorubicin Hydrochloride as Model Drug

Doxorubicin hydrochloride, as an antitumor drug, belongs to the anthracycline broad-spectrum antitumor drug and has strong cytotoxicity. Although doxorubicin hydrochloride is widely used in various anti-tumor treatments, it also brings many adverse reactions due to its strong cytotoxicity. Therefore, for many years, pharmacists have been devoted to finding effective means of reducing the toxicity of doxorubicin hydrochloride, and preparing it into a corresponding formulation is a dosing regimen. In addition, due to the unique anthracycline structure of doxorubicin, it has strong red fluorescence characteristics, which facilitates detection and facilitates the design and implementation of various experiments.

3. Selection of Doxorubicin Hydrochloride Drug-Loading Mode

Figure 13:
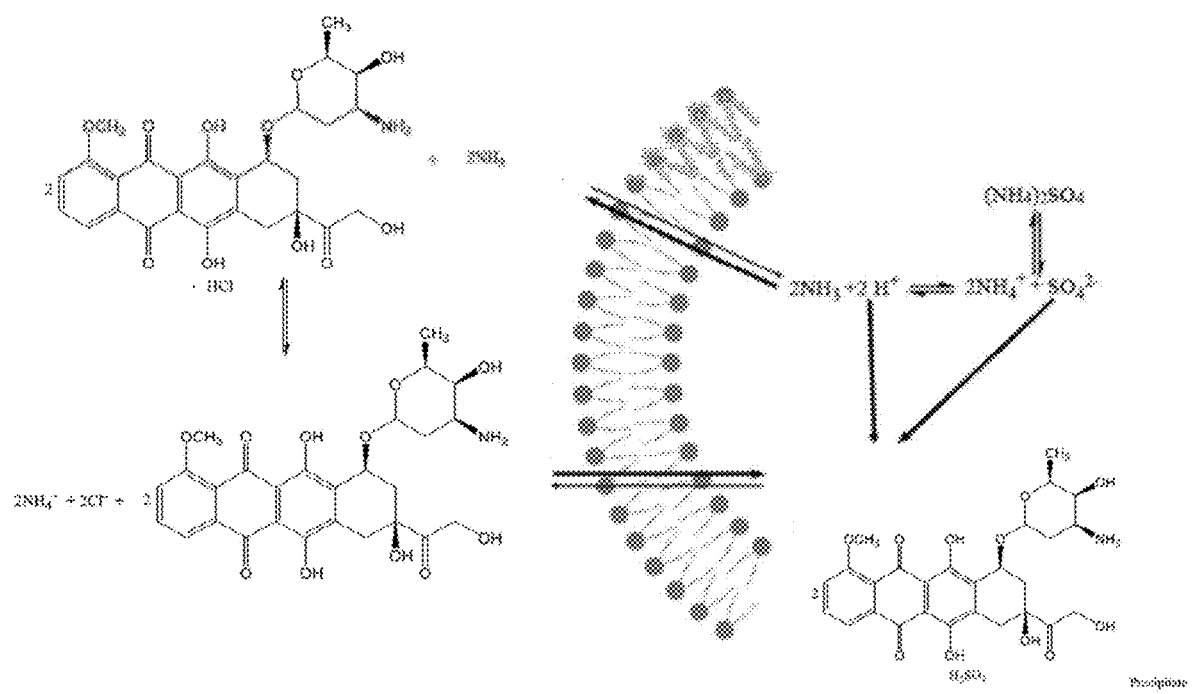
FIG. 13 is a schematic of ammonium sulfate active loading.

In the initial design of the nanobowls@Dox-liposomes, it has been desired to use a passive drug loading method in which a certain concentration of doxorubicin hydrochloride is directly added to the hydration solution during the hydration of the liposomes. But through experiments, it was found that the encapsulation efficiency and loading efficiency of doxorubicin by this method were very low. The reason is that the volume of the inner aqueous cavity of the liposomes is much smaller than that of the outer aqueous phase, which results in that the majority of doxorubicin hydrochloride remains in the outer aqueous phase and cannot be encapsulated by the liposomes. Thus, the passive loading method not only fails to achieve high concentration drug loading, but also results in waste of large amounts of free drug. For this reason, the active loading of doxorubicin hydrochloride was achieved by an ammonium sulfate gradient method using a drug loading method similar to the FDA approved Doxil formulation. Since doxorubicin hydrochloride is a weakly basic drug, a higher encapsulation efficiency can be achieved using the weak acidity of ammonium sulfate. Firstly, the aqueous solution containing ammonium sulfate was hydrated to make the inner aqueous cavity of liposome present a weak acidic environment; subsequently, a pH gradient is established between the external aqueous phase and the internal aqueous cavity by dialysis; doxorubicin hydrochloride was added into the external aqueous phase, and $NH_3$ small molecules generated by the ionization equilibrium of ammonium sulfate easily pass through the phospholipid bilayer, and are neutralized with doxorubicin hydrochloride in the external aqueous phase, resulting in doxorubicin molecularization and transmembrane into the internal aqueous cavity of the liposome; after entering the inner aqueous cavity of the liposome, doxorubicin binds to $H^+$ in the inner aqueous cavity and ionizes into salt again; doxorubicin sulfate formed will form insoluble crystals in the inner aqueous cavity, thereby hindering the re-transmembrane leakage of doxorubicin and achieving a higher encapsulation efficiency. See FIG. 13 for detailed principle.

VII. Summary

Doxorubicin was successfully encapsulated in nanobowls@liposomes prepared by incubating nanobowl-bowl with liposomes and active loading of ammonium sulfate. Construction of nanoparticle characterization evaluation system: DLS was used to detect the change of size and Zeta potential, TEM was used to observe the structure of phospholipid bilayer, microplate reader was used to detect the fluorescence signal of doxorubicin and DiR labeled nanoparticles, and encapsulation efficiency and drug loading were determined. The final nanoparticles had an average particle size of 143.6 nm and a Zeta potential of −17.9 mV. The results of transmission electron microscopy showed that the shape of nanoparticles was intact and the structure was clear. The phospholipid bilayer of liposomes could be clearly observed by the successful fusion and coating of nanoparticles with liposomes. The UV absorption and fluorescence signals of doxorubicin and DiR were detected in the microplate reader, which further proved the successful construction of nanoparticles. The encapsulation efficiency and drug loading were 89.57% and 2.34%, respectively. Through active drug loading, the encapsulation efficiency and drug loading of doxorubicin were significantly improved, which provided the feasibility and theoretical basis for clinical transformation.

EXAMPLE 3 Stability Investigation of Dox-Liposome Nanobowls@Dox-Liposomes and Evaluation of In Vitro Anti-Tumor Therapy Instruments and Materials 1. Instruments and Equipment

TABLE 11

| | |
|---|---|
| XS205s electronic balance | METTLER TOLEDO |
| JY92-II ultrasonic cell disruptor | Ningbo SCIENTZ Biotechnology Co. Ltd. |
| HS-70 thermostatic magnetic stirrer | IKA, Germany |
| R-200 rotary evaporator | Buchi, Switzerland |
| Vacuum drying oven | Shanghai Yiheng Technology Instrument Co. Ltd. |
| Mini-extrusion device | Avanti Company, USA |
| Sorvall ST 16 frozen centrifuge | ThermoFisher, USA |
| CM-120 transmission electron microscope | Philips, Netherlands |
| Malvern Zetasizer Nano ZS laser particle sizer | Malvern Company, British |
| SpectraMax M2 Biomolecular mcroplate reader | Molecular Devices, USA |
| ZQTY-70 oscillating incubator | Shanghai Zhichu Instrument Co. Ltd. |
| RLPHR 2-4 LD freeze dryer | Marin Christ, inc., USA |
| MS2 vortex mixer | IKA, Germany |
| Laboratory ultrapure water system | Millipore Company, USA |

TABLE 11-continued

| | |
|---|---|
| LSM5 laser confocal microscope | Zeiss, Germany |
| DP50 Upright Metallurgical Microscope | Olympus Co., Japan |
| Carbon dioxide cell incubator | ThermoFisher, USA |
| 1300 Series A2 Ultra Clean Console | ThermoFisher, USA |

2. Materials and Reagents

TABLE 12

| | |
|---|---|
| CCK-8 kit | Tongren Chemical Inst. Shanghai |
| DAPI | ThermoFisher, USA |
| Cover glass | VWR Company, USA |
| DMEM basal medium | ThermoFisher, USA |
| Penicillin streptomycin double antibody | ThermoFisher, USA |
| Fetal bovine serum | Gemini Company, USA |
| DPBS | Hyclone Company, USA |
| 0.25% Trypsin (with EDTA) | ThermoFisher, USA |
| Paraformaldehyde | Shanghai Aladdin Chemical Reagent Co. Ltd. |
| DiR probe | ThermoFisher, USA |
| Triton X-100 | Sangon Biotech (Shanghai) |
| doxorubicin hydrochloride | Beijing Huafeng Lianbo Technology Co. Ltd. |
| G-50 dextran gel | GE Corp. USA |
| Anti-fluorescence quenching sealing liquid | Santa Cruze, inc., USA |

3. Cell lines and animals

4T1 breast cancer cells, purchased from Caliper Life Sciences (Hopkinton, MA), were used in this experiment at passage numbers 3-5.

4. Preparation of related reagents 1) 4T1 cell culture solution: DMEM basal medium, 1 penicillin streptomycin double antibody, 10% fetal bovine serum;

2) 4% paraformaldehyde solution: with PBS (0.01 M) of pH 7.4 as the solvent, weighing 40 g of paraformaldehyde and placing into 800 mL of PBS solution, shaking and dissolving in a constant temperature shaker at 60° C. overnight; after the solid of paraformaldehyde is completely dissolved, stopping heating, balancing to room temperature, and adding PBS again to dilute the volume to 1 L.

II. Experimental Method

1. Stability evaluation of nanobowls@Dox-liposomes 1.1 Serum stability evaluation 1) Transferring an appropriate amount of nanobowls@liposomes and common Dox-liposome which have been loaded with doxorubicin, respectively adding them into 100% FBS, blowing and shaking evenly, and then placing them into a constant temperature shaking incubator at 37° C. to shake evenly at 120 rpm;

2) at 0, 2, 4, 6, 8, 12 and 24 h respectively, drawing an equal amount of the above-mentioned mixed solution, and determining the fluorescence intensity Ft of doxorubicin in the mixed solution by a microplate reader;

3) after 24 h, adding 0.2% Triton solution, lysing and destroying the liposomes to completely release doxorubicin, recording the fluorescence intensity of doxorubicin $F_{final}$ by microplate reader;

4) calculating the leakage rate of doxorubicin in whole serum according to fluorescence intensity, and the detailed formula is as follows:

$$\text{serum leakage rate (\%)} = \frac{F_t - F_e}{F_{final} - F_e} \times 100\%$$

5) collecting the nanobowls@Dox-liposomes at each time point by centrifugation (24000 g, 15 min) and determining the particle size and potential by DLS after redispersion.

1.2. Lyophilization Stability Evaluation 1) accurately transferring an equal amount of nanobowl-supported adriamycin liposome or common adriamycin liposome sample, loading into EP tube, placing into −80° C. refrigerator for overnight freezing, and then transferring to RLPHR 2-4 LD freeze dryer for freeze drying overnight;

2) taking the freeze-dried nanobowls@Dox-liposome or common Dox-liposome, adding the same amount of ultrapure water again, and vortexing to fully disperse;

3) observing and recording the dispersion of nanoparticles;

4) determining the change in nanoparticle particle size after redispersion after freeze drying by DLS.

1.3 Storage Stability Evaluation

1) Placing the prepared nanobowls@Dox-liposome dispersion in a refrigerator at 4° C. for cold storage;

2) performing DLS determination of particle size and Zeta potential on the corresponding dates, respectively, and recording long-term storage state changes of the nanoparticles.

2. 4T1 Cell Culture 2.1 4T1 Cell Resuscitation 1) taking out the frozen 4T1 cells from the liquid nitrogen tank, incubating in a 37° C. water bath to thaw them;

2) after the solid in the frozen storage tube melts into a liquid, transferring into a centrifuge tube, centrifuging at 800 g for 5 min, and discarding the supernatant frozen storage solution;

3) adding 5 mL of cell culture solution containing 10% fetal bovine serum, blowing and beating the cells with a pipette to evenly disperse them, and then putting them into T-25 culture flask;

4) placing the culture flask in a constant temperature incubator containing 5% $CO_2$ at 37° C., and observing the cell growth state under microscope the next day.

2.2. Cell Culture and Passage 1) using a pipette to suck out the cell culture solution in the original T-25 culture flask, and adding 1 mL of DPBS to rinse for 1-2 times to remove the residual culture solution;

2) adding 1 mL of 0.25% trypsin, shaking the culture flask back and forth, so that the trypsin evenly covers the bottom of the culture flask, incubating in a constant temperature incubator containing 5% $CO_2$ at 37° C. for 3 min;

3) adding 4 mL cell culture medium containing 10% fetal bovine serum, diluting trypsin and stop digestion;

4) using a pipette to blow and beat the cell suspension, so that it is evenly dispersed to obtain a single cell suspension, dispense the cell suspension into a new T-25 culture flask in the proportion of 1:4, and supplementing fresh cell culture solution to 5 mL;
5) returning the culture flask to a constant temperature incubator containing 5% $CO_2$ at 37° C., and observing the cell growth state under a microscope the next day;
6) performing the exchange passaging again 2 days later.

2.3 Cell Cryopreservation 1) sucking off the culture solution in the original T-25 culture flask, and adding 1 mL of DPBS to rinse for 1-2 times to remove the residual culture solution;
2) adding 500 μL of 0.25% trypsin, shaking the culture flask back and forth, so that the trypsin uniformly covers the bottom surface of the culture flask, and incubating in a constant temperature incubator containing 5% $CO_2$ at 37° C. for 3 min;
3) adding 4 mL cell culture medium containing 10% fetal bovine serum, diluting trypsin and stop digestion;
4) blowing and beating the cell suspension with a pipettor to disperse it evenly to obtain a single cell suspension;
5) collecting the cell suspension in a sterile centrifuge tube, centrifuging at 800 rpm for 5 min, and sucking and discarding the supernatant;
6) adding 1 mL cell cryopreservation solution, and blowing and beating into single cell suspension again;
7) transferring single cell suspensions to cryovials, labeling, storing overnight at −80° C., and then transferring to liquid nitrogen tanks for storage.

2.4 Uptaking Experiment of Nanobowls@Dox-Liposomes in 4T1 Breast Cancer Cells 1) preparing nanobowls@Dox-liposomes and common Dox-liposomes by the above-mentioned method;
2) after digestingthe 4T1 cells, inoculating into the dishes containing cover slips at a cell concentration of 2×10$^5$ cells/mL, with an inoculation volume of 1 mL, and inoculating 3 dishes for each nanoparticle group;
3) placing the cell-inoculated plate in a constant temperature incubator containing 5% $CO_2$ at 37° C. for 12 h;
4) respectively adding corresponding liposome dispersion with doxorubicin concentration of 0.5 mg/mL into each dish, and continuing to incubate at 37° C. in 5% $CO_2$ constant temperature incubator for 1 h;
5) after 1 h, aspiratingthe cell culture medium, rinsing 3 times with DPBS, and then fixing with 1 mL 4% paraformaldehyde for 20 min;
6) at the end of fixation, aspirating paraformaldehyde, rinsing again 3 times with DPBS and finally adding 1 mL of DPBS solution containing 6 μL DAPI, incubating for 5 min, and washing 3 times with DPBS;
7) placing the fixed sample under laser confocal microscope, and using Alexa Fluor® 488 channel to observe the cell uptake of nanoparticles.

3. Detecting Cell Viability by CCK-8 Method 1) taking 4T1 cells in logarithmic growth phase, after counting, diluting them with complete cell culture medium to the density of 2×10$^5$ cells/mL, and inoculating them into 96-well plate, adding 200 μL into each well. Incubating the culture plate in a 37° C., 5% $CO_2$ constant temperature cell incubator for 12 h; 2) preparing different nanoparticle structures in a serum-free culture medium with a drug concentration gradient to prepare a culture medium containing different concentrations of liquid medicine, sucking out the old culture medium in the culture plate, and then adding 200 μL of a new culture medium containing the liquid medicine to each well;
3) placing the 96-well plate containing cells in a 37° C., 5% $CO_2$ constant temperature cell incubator for culture for appropriate time;
4) diluting CCK-8 liquid with serum-free culture medium by a factor of 10 according to 1:10, sucking out the old culture medium in the culture plate, and adding 100 μL culture medium containing CCK-8 into each well;
5) incubating the culture plate in a 37° C., 5% $CO_2$ constant temperature cell incubator for 0.5-1 h;
6) determining the absorbance of each well with a microplate reader at a wavelength of 450 nm.

4. Statistical Processing

The experimental results were presented as "mean±SD", and statistical analysis was performed using GraphPad Prism 7.0 medical mapping software and graphs were prepared. T test was used for comparison between the two groups; multi-factor analysis of variance was used for statistical analysis among three groups and above, and the difference was considered to be statistically significant at $p<0.05$.

III. Results

1. Nanoparticle Serum Stability

Figure 14:
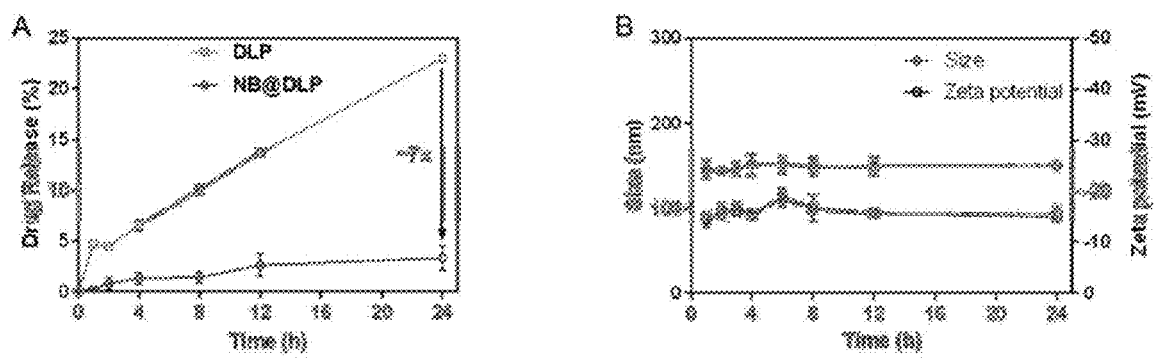
FIG. 14 is: (A) drug leakage rate of common Dox-liposomes and nanobowls@Dox-liposomes in whole serum; (B) change of particle size and Zeta potential of nanobowls@liposomes in serum within 24 h, n=3.

In this study, nanoparticles were dispersed in 100% fetal bovine serum and placed in a 37° C. constant temperature shaking incubator for shaking culture, so as to approximate the surrounding environment of nanoparticles in the circulatory system and the blood flow impact. The leakage rate of doxorubicin was calculated by determining the fluorescence intensity of doxorubicin at different time. Results As shown in FIG. 14. A, the leakage rate of Nanobowls@Dox-liposomes in serum was significantly reduced, the average leakage rate was 3.34% within 24 h, remained below 5%, and almost no leakage was observed. However, the average leakage rate of Dox-liposomes was 23.00%, and the difference between the two is nearly 7 times. This result suggests that the drug leakage in the aqueous cavity of liposomes can be effectively reduced by the support of nanobowl. At the same time, the changes of particle size and Zeta potential of nanobowls@liposomes in serum within 24 h were investigated. As shown in FIG. 14. B, neither particle size nor Zeta potential changed significantly.

2. Freeze-Drying Stability of Nanoparticles

Figure 15:
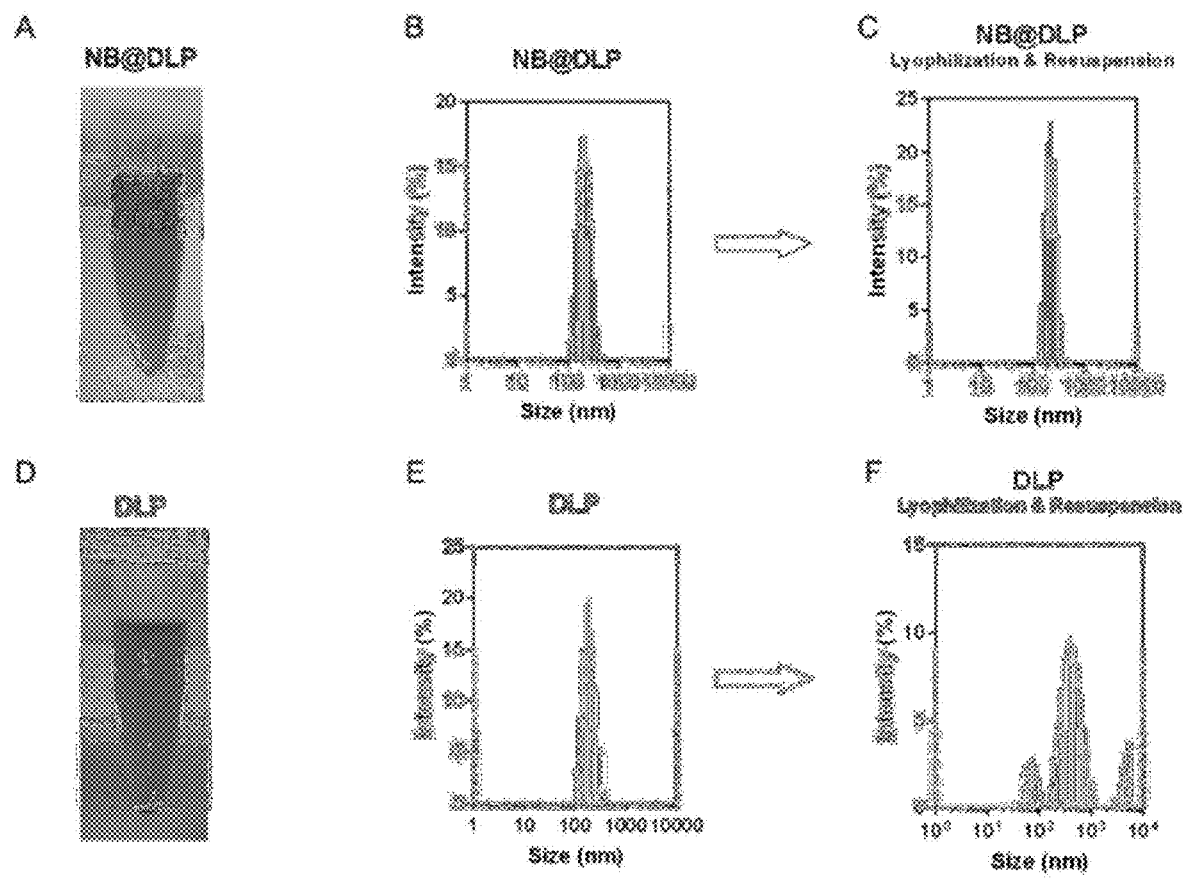
FIG. 15 is: (A, D) redispersed state of nanobowls@Dox-liposome and common Dox-liposome after freeze-drying, respectively, (B, C, E, F) comparison graphs of particle size distribution of nanobowls@Dox-liposome and common Dox-liposome before and after freeze-drying, respectively.

After freeze-drying the two liposomes separately, ultrapure water was added again and vortexed to make them sufficient. The results showed that after vortexing for enough time, Nanobowls@Dox-liposomes could be well dispersed. However, the common Dox-liposome group was not dispersed uniformly and was in a suspension state, and a visible red precipitate could be observed at the bottom of the tube after standing, as shown in FIGS. 15. A and D. Then, the same amount of sample supernatant was taken to detect the DLS particle size, and the Intensity parameter was used as the weight, the results showed that the range of DLS particle size distribution was significantly broadened, and the DLS particle size distribution was multi-modal. In comparison, the particle size distribution of Nanobowls@Dox-liposomes was still monomodal with good dispersibility, and the mean particle size was similar to that before freeze-drying (FIG. 15. B, C, E, F).

3. Storage Stability of Nanoparticle

Figure 16:
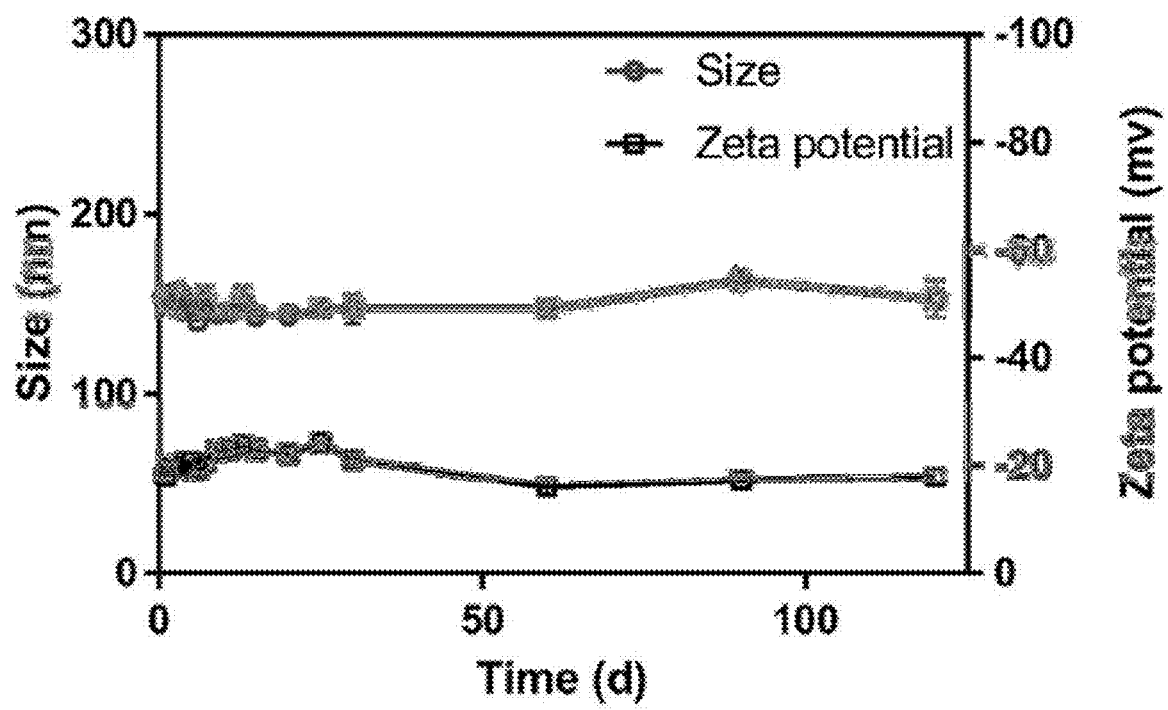
FIG. 16 is a graph of particle size distribution and zeta potential change of nanobowls@Dox-liposomes during storage at 4° C., n=3.

The storage stability of the nanoparticles was monitored by periodic DLS determination of particle size and Zeta potential on nanobowls@Dox-liposomes stored at 4° C. Results as shown in FIG. 16, the nanoparticles maintained stable particle size and Zeta potential for up to 120 days, with good dispersion and no obvious sedimentation and agglomeration, demonstrating that the nanoparticles were stable for long-term storage.

4. 4T1 Cell Nanoparticle Uptake

Figure 17:
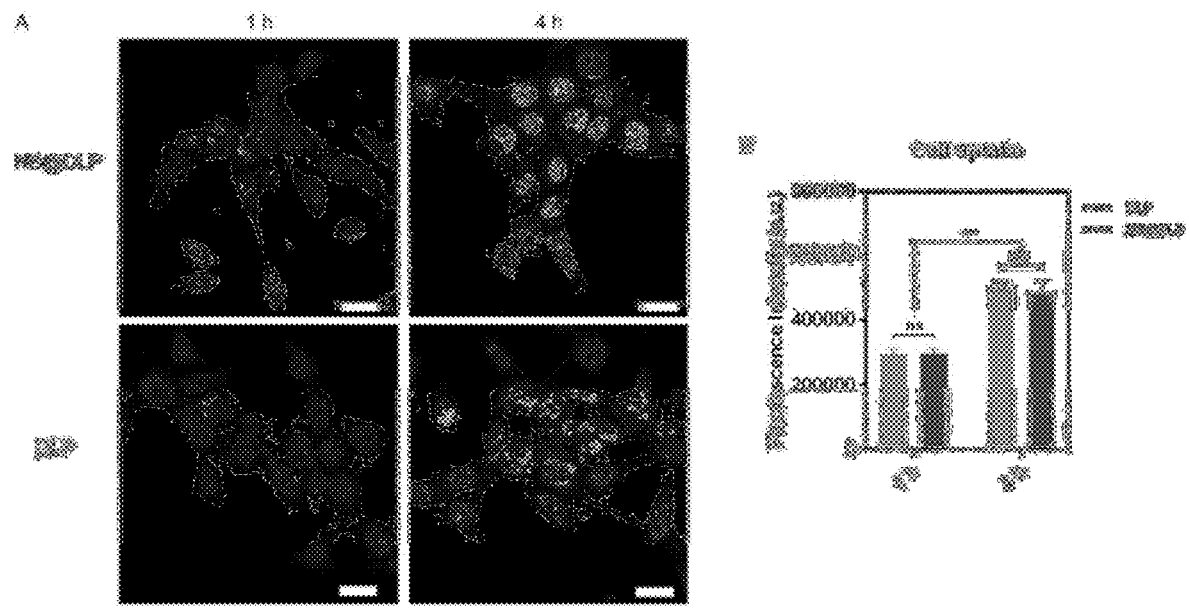
FIG. 17 is: (A) nanoparticle uptake by tumor cells photographed under laser confocal microscope, Bar=25 m; (B) quantitative analysis of the fluorescence intensity of nanoparticles uptake by cells, results are expressed as "mean±SD", n=5.*P <0.05, P <0.01, *P <0.001.

Under a laser scanning confocal microscope with a magnification of 40, the uptake of nanoparticles by 4T1 cells was observed with excitation light of the same intensity. It can be seen from FIG. 17. A that the fluorescence intensity of doxorubicin in 4T1 cells gradually increases with the passage of time, and it can be inferred therefrom that the uptake amount of drug-loaded nanoparticles by 4T1 cells also increases with the passage of time; at the same time, after incubation for 4 h, the fluorescence signal of doxorubicin in nucleus region was significantly increased compared with that in 1 h, suggesting that doxorubicin began to be released into the nucleus; however, no matter whether the uptake time is 1 h or 4 h, the intracellular fluorescence intensity of Nanobowls@Dox-liposomes is basically the same as that of common Dox-liposomes, with no significant difference. The quantitative statistics of fluorescence is shown in FIG. 17. B, which is consistent with the observed phenomenon.

5. Effect of Nano-Drugs on Cell Viability

Figure 18:
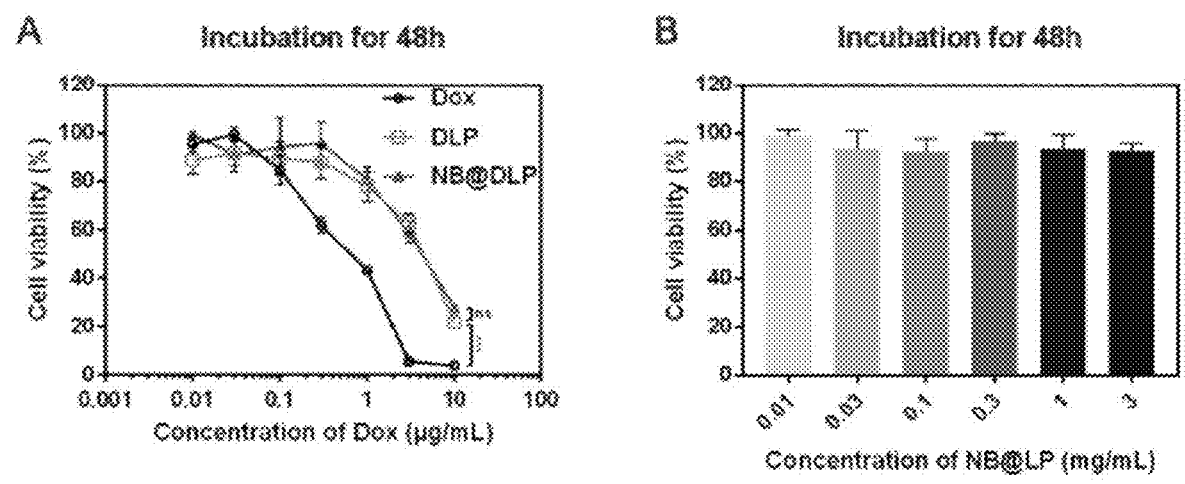
FIG. 18 is: (A) effect of free doxorubicin hydrochloride, common Dox-liposomes and nanobowls@Dox-liposomes on the viability of 4T1 breast cancer cells, (B) effect of blank nanobowls@liposomes without drug on the viability of 4T1 breast cancer cells. The results are expressed as mean±SD, n=4.  P <0.01, *P <0.001.

In this study, 0.01, 0.03, 0.1, 0.3, 1, 3 and 10 μg/mL of serum-free medium containing nanoparticulate drug or free drug was prepared using doxorubicin concentration range of 0.01-10.00 μg/mL. Respectively add the above solutions into corresponding 96-well plates for incubation. The cell viability was determined by CCK-8 assay after 48 h incubation. Results As shown in FIG. 18. A, at the cell level in vitro, the effect of free doxorubicin on cell viability was significantly stronger than that of common Dox-liposomes and nanobowls@Dox-liposomes; secondly, after incubation for 48 h, there was no significant difference in cell viability between the two groups. Thus, we concluded that at the cellular level in vitro, the effect on cell viability was almost the same the common Dox-liposome group and the nanobowls@Dox-liposome group, while the free drug was more cytotoxic than the two groups of liposomes. In addition, CCK-8 detection was performed with the non-loaded nanobowls@liposomes at the concentration range of 0.01-3 mg/mL, and incubating for 48 h. The results showed that there was no significant cell viability attenuation, suggesting that the nano-particles had good biocompatibility and had no toxic effect on tumor cells even at higher doses.

IV. Discussion

1. Selection of Tumor Cells

According to Doxil approved by US FDA and Myocet indications approved in Europe, Dox-liposomes are approved for the treatment of metastatic breast cancer with prolonged survival and significantly reduced adverse reactions. The growth and metastatic properties of 4T1 cells as mouse in BALB/c mice are very similar to those of breast cancer in humans. This tumor cell has been widely used as an animal model for human stage VI breast cancer. Therefore, in this example, 4T1 cells were selected as a subject for subsequent experiments.

2. In Vitro Simulated Circulatory System

The circulatory system is the first in vivo environment to be reached after intravenous injection of the drug, in which the nano-drug will be subjected to the interaction of various proteins, cytokines and cells, and to the impact of blood flow, thereby generating a series of changes. However, if the circulatory system is simulated in vitro, the most ideal condition is to collect the whole blood of mice for corresponding experiments. However, due to the limitations of the small amount of whole blood and the easy coagulation of whole blood in mice, this paper chooses 100% fetal bovine serum as the environment, and uses constant temperature oscillation at 37° C. to approximately simulate the interaction of nano-drugs with various proteins and cytokines and the impact of blood flow in the circulatory system in vivo, while the interaction with blood cells is not involved in this paper.

3. Effect of Nanob Owl on Stability

From the foregoing results, it can be seen that the support of the—bowl successfully reduced drug leakage from the liposomes in the serum environment and significantly improved the ability of the nano-formulation to be redispersed after undergoing freeze drying. Support of the nanobowl in the circulation system: (1) Can counteract the impact of partial blood flow on liposomes, reduce the degree of deformation of liposomes, thereby reducing the problem of liposome rupture and content leakage caused by excessive deformation; (2) however, the binding of various proteins and cytokines in serum to liposomes to change the permeability of liposomes is another important reason for the leakage of liposome contents. Due to the special opening structure of nanobowl, the leakage range is greatly reduced. Only when the permeability of phospholipid bilayer in the mouth of the bowl is changed, the leakage of liposome contents will be caused, thus reducing the probability of leakage.

4. Effect of Nanob Owl Liners on Cytotoxicity and Uptake Capacity

At the beginning of the experimental design, the question of whether the addition of nanobowl make the cells affect the uptake capacity of nano-drugs has attracted our attention. Uptake of nanoparticles by cells is often related to the surface properties of the nanoparticles, such as nanoparticle morphology, surface groups, and Zeta potential. Although the morphology of nanobowl is irregular, the complete coating of coating of its surface completely covered by phospholipid and still present a vesicle. Thus, nanoparticle morphology, surface groups, and Zeta potential are comparable to conventional liposomes. Confocal microscopy statistics also confirm that the inner liner of the nanobowl does not affect the uptake of liposomes by cells.

Likewise, whether the inner liner of the nanobowl affects the drug release behavior in the nano-drug and thus the cytotoxicity. With this doubt, this example designed the corresponding CCK-8 assay. The results showed that nanobowl did not affect the toxicity of drug-loaded liposomes to cells. In addition, the unloaded blank nanobowls@liposomes likewise did not exhibit significant cytotoxicity, demonstrating good biocompatibility of the vehicle.

V. Summary

The stability of nano-drug was evaluated by investigating the changes of particle size, zeta potential and leakage rate of nano-drug in three different environments (simulated circulation system, freeze-drying and 4° C. storage environment). It can be seen from the above-mentioned test that the prepared nanobowls@Dox-liposome can maintain good dispersibility and extremely low leakage rate under in vivo circulatory system, freeze-drying and low-temperature storage environment. The uptake and cytotoxicity of nano-drug by 4T1 cells were investigated at the cellular level in vitro. The results showed that the nanobowl support had no significant effect on cells, and the uptake of Nanobowls@Dox-liposomes and common Dox-liposomes and the toxicity of liposomes to cells were comparable.

Example 4

In Vivo Evaluation of Anti-Tumor Therapy with Nanobowls@Dox-Liposome

I. Instruments and Materials

1. Instruments and Equipment

TABLE 13

| | |
|---|---|
| XS205s electronic balance | METTLER TOLEDO |
| JY92-II ultrasonic cell disruptor | Ningbo SCIENTZ Biotechnology Co. Ltd. |
| HS-70 thermostatic magnetic stirrer | IKA, Germany |
| R-200 rotary evaporator | Buchi, Switzerland |
| Vacuum drying oven | Shanghai Yiheng Technology Instrument Co. Ltd. |
| Mini-extrusion device | Avanti Company, USA |
| Sorvall ST 16 frozen centrifuge | ThermoFisher, USA |
| CM-120 transmission electron microscope | Philips, Netherlands |
| Malvern Zetasizer Nano ZS laser particle sizer | Malvern Company, British |
| SpectraMax M2 Biomolecular mcroplate reader | Molecular Devices, USA |
| ZQTY-70 oscillating incubator | Shanghai Zhichu Instrument Co. Ltd. |
| MS2 vortex mixer | IKA, Germany |
| Laboratory ultrapure water system | Millipore Company, USA |
| LSM5 laser confocal microscope | Zeiss, Germany |
| DP50 Upright Metallurgical Microscope | Olympus Co., Japan |
| Carbon dioxide cell incubator | ThermoFisher, USA |
| Invitrogen life countess cell counter | ThermoFisher, USA |
| 1300 Series A2 Ultra Clean Console | ThermoFisher, USA |
| Olympus electron microscope | Olympus Co., Japan |

2. Materials and Reagents

TABLE 14

| | |
|---|---|
| DMEM basal medium | ThermoFisher, USA |
| Penicillin streptomycin double antibody | ThermoFisher, USA |
| Fetal bovine serum | Gemini Company, USA |
| DPBS | Hyclone Company, USA |
| 0.25% Trypsin (with EDTA) | ThermoFisher, USA |
| Paraformaldehyde | Shanghai Aladdin Chemical Reagent Co. Ltd. |
| Saline | Huayu (Wuxi) Pharmaceutical Co., Ltd. |
| Pentobarbital sodium | Merck Germany |
| DiR probe | ThermoFisher, USA |
| Triton X-100 | Sangon Biotech (Shanghai) |
| doxorubicin hydrochloride | Beijing Huafeng Lianbo Technology Co. Ltd. |
| G-50 dextran gel | GE Corp. USA |

3. Cell Lines and Animals

4T1 breast cancer cells, purchased from Caliper Life Sciences (Hopkinton, MA). BALB/c female mice aged 4-6 weeks were supplied by Shanghai SLAC Laboratory Animal Co.,Ltd.

4. Preparation of Related Reagents 1) 4T1 cell culture solution: DMEM basal medium, 1 penicillin streptomycin double antibody, 10% fetal bovine serum;
2) 4% paraformaldehyde solution: with PBS (0.01 M) of pH 7.4 as the solvent, weighing 40 g of paraformaldehyde and placing into 800 mL of PBS solution, shaking and dissolving in a constant temperature shaker at 60° C. overnight; after the solid of paraformaldehyde is completely dissolved, stopping heating, balancing to room temperature, and adding PBS again to dilute the volume to 1 L;
3) 1% sodium pentobarbital anesthetic: weighing 100 mg pentobarbital sodium, adding into 10 mL ultrapure water, and vortexing until it is fully dissolved.

II. Experimental Method

1. Establishment of Orthotopic Inoculation Model for 4T1 Breast Cancer

1.1 Preparation of 4T1 Cell Suspension

1) Taking a T-75 culture flask containing 4T1 cells, using a pipette to suck out the cell culture solution in the culture flask, and adding 5 mL of DPBS to rinse for 1-2 times to remove the residual culture solution;
2) adding 2 mL of 0.25% trypsin, shaking the culture flask back and forth, so that the trypsin uniformly covers the bottom surface of the culture flask, and incubating in a constant temperature incubator containing 5% $CO_2$ at 37° C. for 3 min;
3) adding 10 mL serum-free cell culture medium, diluting trypsin and stop digestion;
4) using a pipette to blow and beat the cell suspension to evenly disperse it to obtain a single cell suspension, taking 5 µL of cell suspension and adding placental blue dye solution with the same volume, and using an Invitrogen life countess cell counter to count the cells of cell suspension;
5) centrifuging at 4° C. and 800 g for 5 min, discarding the supernatant, adding an appropriate amount of serum-free cell culture medium according to the intracellular concentration calculated previously, gently blowing and beating the cell block with a pipette to fully disperse it to prepare a single cell suspension, and the final concentration of cell suspension is: $1.6 \times 10^7$/mL;
6) dispensing the 4T1 cell suspension into sterile 2 mL centrifuge tubes and storing at 4° C. until use.

1.2 BALB/c Female Mice Inoculated Orthotopically with 4T1 Cells

1) On the day before inoculation, removing the hair on the right side of the abdomen of the mice to prepare the skin for the next day surgery;
2) the next day, injecting the skin-prepared mice intraperitoneally with 1% pentobarbital anesthetic 100 µL;
3) after complete anesthesia, fixing the limbs, wetting the right side of the abdomen with normal saline, and then using a scalpel to make a light incision on the abdomen;
4) using tweezers to clamp out the 4$^{th}$ mammary fat pad located at the root of right thigh, and injecting 50 µL of 4T1 single cell suspension prepared above;

5) loosening the tweezers, positioning the fat pad, and then suturing the abdominal wound;
6) at the end of inoculation, returning the mice to their cages and the front leg of each mouse was taped with a label tape.

2. Animal Grouping and Dosing Regimen 1) four days after inoculation, tumor volume was determined using vernier calipers: the longest and shortest diameters (L, W) of the tumor were measured every other day, and the tumor volume was calculated according to the following formula:

$$\text{tumor volume } v = \frac{L \times W^2}{2}$$

2) after the tumor volume grew to 80 mm³, it was evenly divided into the following 5 experimental groups according to the size of tumor volume:
① Saline group (Saline)
② Blank nanobowls@liposomes group (NB@LP)
③ Doxorubicin hydrochloride group (Dox)
④ Common Dox-liposome group (DLP)
⑤ Nanobowls@Dox-liposome group (NB@DLP)

3) On the 8$^{th}$, 11$^{th}$ and 14$^{th}$ day after inoculation, the corresponding drugs were intravenously injected into the tail vein of each experimental group, and the corresponding drugs were administered to each group at a dose of 4 mg/kg of doxorubicin.

3. Monitoring of Mouse Body Weight and Tumor Volume 1) determining body weight and tumor length and diameter every 2 days after the first dose of group, calculating tumor volume, and recording and summarizing all results;
2) using GraphPad Prism 7.0 medical mapping software for data induction, statistical analysis, and making charts.

4. Immunohistochemical Staining of Tissue Sections 1) after the last intravenous administration, selecting several mice in each experimental group, after sacrifice, dissecting and removing tumor tissues and important organs of mice, and fully immersing in 4% paraformaldehyde solution for fixation;
2) during fixation, replacing fresh 4% paraformaldehyde solution several times to wash out residual blood. After the supernatant solution was clarified, paraffin embedding, sectioning and immunohistochemical staining: TUNEL, PCNA and H&E staining;
3) observing the stained sections under microscope and photographing to collect images, using Image-Pro Plus 6.0 software for image analysis to calculate the positive rate of tumor cell apoptosis and proliferation.

5. Observation of Mouse Survival Period 1) at the end of administration, determining body weight and tumor length and diameter every 2 days;
2) observing the mental status, vital signs and survival status of mice;
3) recording mortality and euthanizing mice when mice died or when their tumor-bearing volume exceeded 2000 mm³.

6. Statistical Processing

The experimental results were presented as "mean±SD", and statistical analysis was performed using GraphPad Prism 7.0 medical mapping software and graphs were prepared. T test was used for comparison between the two groups; multi-factor analysis of variance was used for statistical analysis among three groups and above, and the difference was considered to be statistically significant at p<0.05.

III. Results

Figure 19:
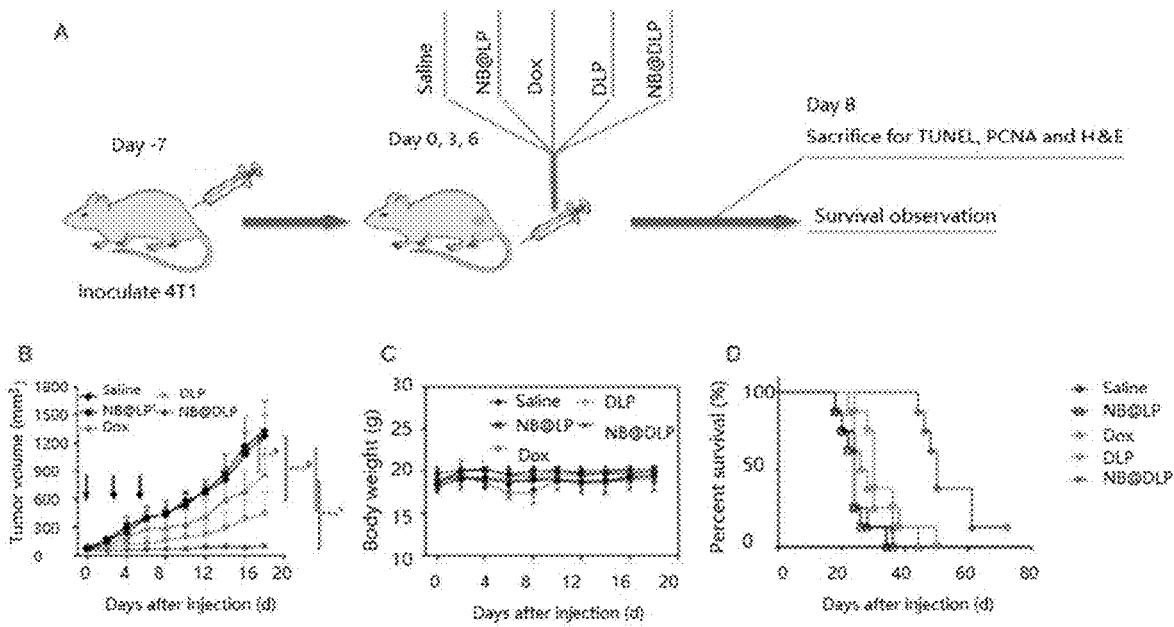
FIG. 19 is a graph showing that nanobowls@Dox-liposomes have good efficacy in treating 4T1-bearing breast cancer in BALB/c female mice; (A) dosing scheme; (B, C) tumor volume and body weight of tumor-bearing mice in each dose group, n=8; in FIG. B, a is the statistical difference of tumor volume between free doxorubicin and normal saline and blank vector group, b is the statistical difference of tumor volume between common Dox-liposome and normal saline and blank vector group, and c is the statistical difference of tumor volume between nanobowls@Dox-liposome and other four groups of experimental groups; (D) survival curves of tumor-bearing mice in each dose group, * P <0.05,  P <0.01, * P <0.001.

1. Pharmacodynamic Evaluation of Nanobowls@Dox-Liposome in the Treatment of Breast Cancer To investigate the therapeutic effect of nanobowls@Dox-liposomes on 4T1 breast cancer, BALB/c female mice inoculated orthotopically with tumor cells were started one week later and given the corresponding drugs via tail vein injection on days 0, 3 and 6, respectively. From the first administration (Day 0), the body weight and tumor volume of the mice were recorded and the survival condition of the mice was observed, and a survival curve was drawn, and the results are shown in FIG. 19. As shown in FIG. 19. B, compared with compared with the control group, the tumor volume growth rate of free doxorubicin, common Dox-liposome and nanobowls@Dox-liposome was slowed down to different degrees, indicating that doxorubicin can effectively inhibit tumor growth. However, comparing the three groups of drug-containing experimental groups, it is not difficult to find that, according to the order of anti-tumor effect from good to poor, the efficacy of nanobowls@Dox-liposome is the most significant, and tumors almost no longer grow; Dox-liposomes could not completely inhibit tumor growth, but the overall growth rate was slower; however, the worst dose group of free doxorubicin, although the increase in volume slowed down, could not achieve the expected treatment of tumor. The reason may be related to the excessive in vivo clearance rate of free doxorubicin, and could not effectively accumulate at the tumor site. In addition, by monitoring the body weight of mice (FIG. 19. C), it was found that during the administration of free doxorubicin, the body weight showed significant decrease, the body was lean, and the mental status also showed a certain degree of listlessness, indicating that free doxorubicin itself had a certain degree of toxic side effects on the body.

Similarly, FIG. 19. D and Table 15 show the survival curves of mice in which the median survival time was 24 days, 24 days, 27 days, 30 days and 50 days for saline, blank nanobowls@liposomes, free doxorubicin, regular Dox-liposomes and nanobowls@Dox-liposomes, respectively. Compared with normal saline control group, the survival time of tumor-bearing mice was prolonged in drug-containing groups; wherein, compared with the control group, free doxorubicin had little effect, and the median survival time was only 3 days longer (12.50%); however, compared with the control group, Dox-liposome prolonged 6 days (25.00%), and the efficacy was improved; in the three groups, nanobowls@Dox-liposomes had the most significant effect, with the longest median survival time of 50 days, which was extended by 26 days (108.33%) compared with the control group, and by 20 days (66.67%) compared with common Dox-liposomes. Furthermore, in the 72-day observation period, there is still one animal that has not died.

TABLE 15

Median survival time of 4T1 breast cancer mice after administration in different experimental groups

| | Median survival (d) | Prolong duration (d) | Prolonged rate (%) |
|---|---|---|---|
| Saline | 24 | — | — |
| NB@LP | 24 | 0 | 0 |

TABLE 15-continued

Median survival time of 4T1 breast cancer mice after administration in different experimental groups

|  | Median survival (d) | Prolong duration (d) | Prolonged rate (%) |
|---|---|---|---|
| Dox | 27 | 3 | 12.50 |
| DLP | 30 | 6 | 25.00 |
| NB@DLP | 50 | 26 | 108.33 |

2. Nano-Drug Promoting Tumor Apoptosis and Inhibiting Tumor Proliferation

Figure 20:
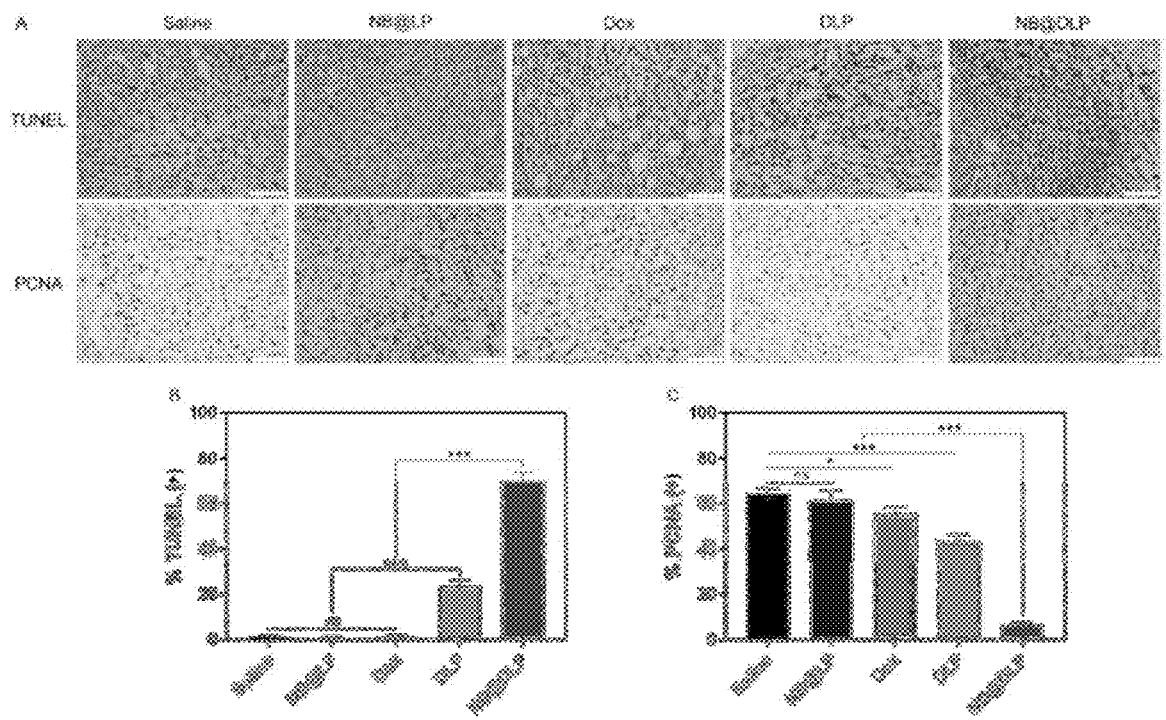
FIG. 20 is (A) pathological section and immunohistochemical staining analysis of tumor tissue of 4T1 tumor-bearing mice, Bar=100 m, (B, C) statistical chart of TUNEL and PCNA positive rate of tumor tissue after treatment in each experimental group; the results are expressed as mean SD, n=5, * P <0.05,  P <0.01, * P <0.001.

According to the above inhibition effect of each experimental group on 4T1 tumor, the tumor tissues of tumor-bearing mice were taken out for pathological section and immunohistochemical staining analysis, TUNEL and PCNA staining were performed respectively to detect tumor cell apoptosis and proliferation. Results As shown in FIG. 20. A, the drug-containing group inhibited the apoptosis of tumor cells in varying degrees, and also inhibited the proliferation of tumor cells in varying degrees; among them, the nanobowls@Dox-liposomes have the most significant effect of promoting apoptosis and inhibiting growth, followed by common adriamycin liposomes, and free adriamycin has the worst effect. The semi-quantitative results are shown in FIGS. 20. B and C; while the blank nanocarrier group did not show significant efficacy, which is consistent with the results of in vitro cell experiments.

3. Toxicity Analysis of Nano-Drug on Important Organs

Figure 21:
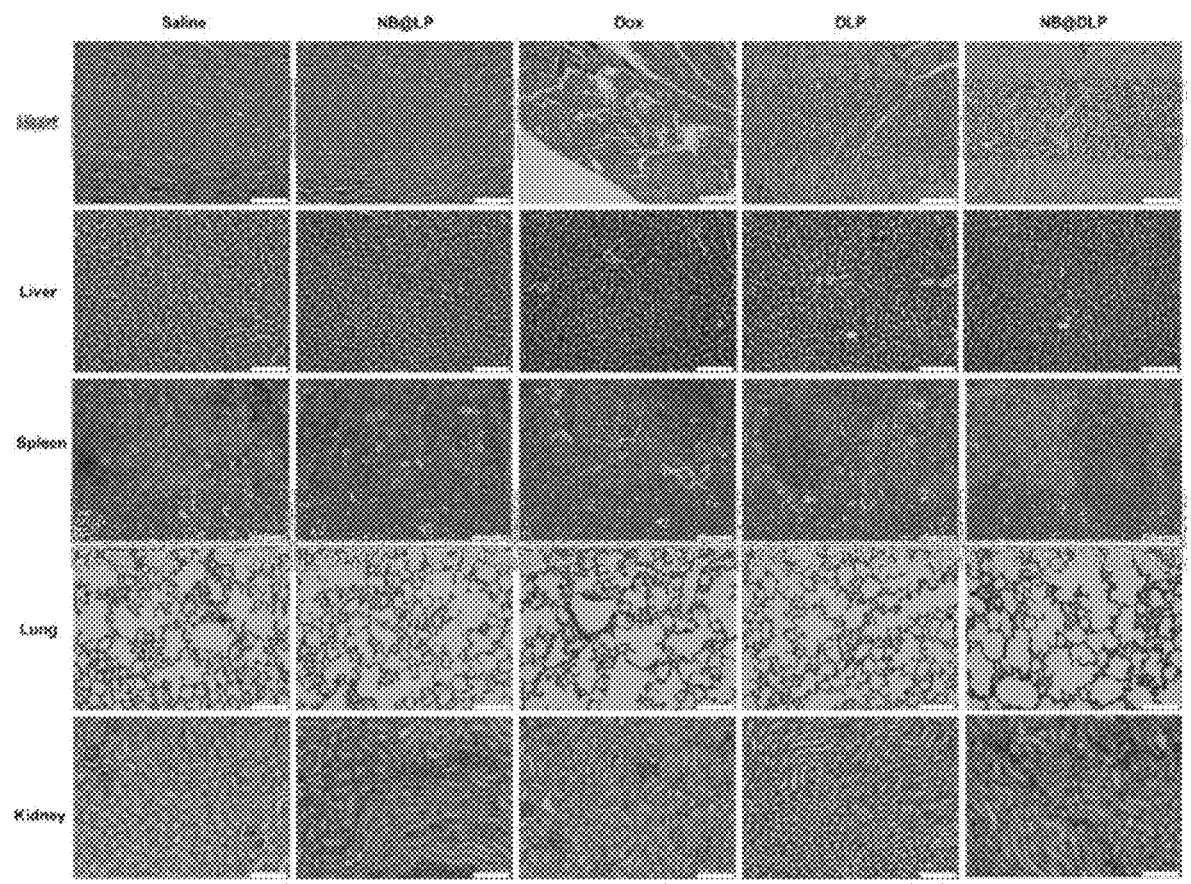
FIG. 21 is an immunohistochemical staining analysis of vital organ tissue of 4T1 tumor-bearing mice, Bar=100 m.
Figure 22:
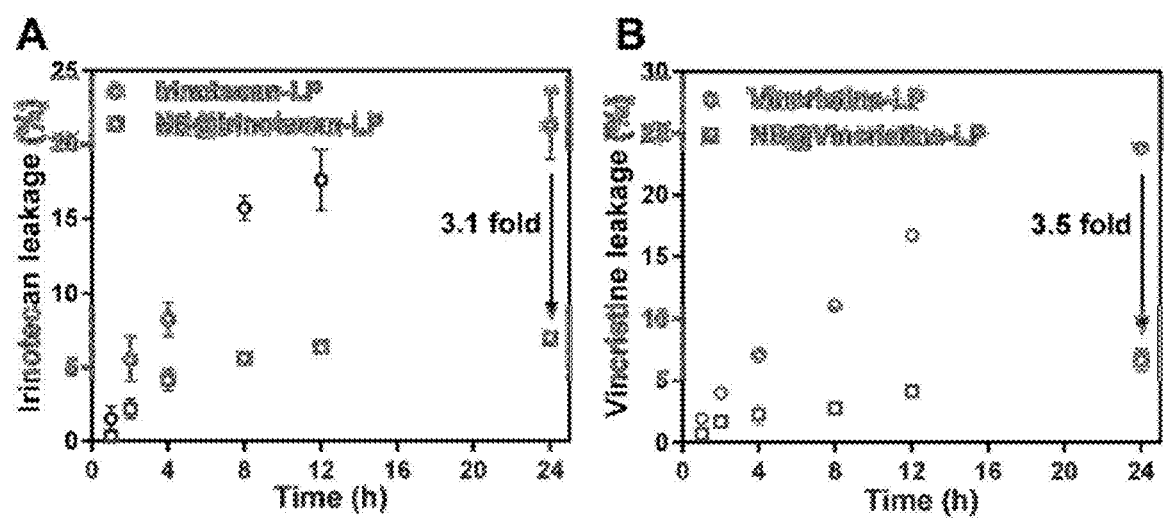
FIG. 22 is: (A) common irinotecan liposomes and nanobowl-supported irinotecan liposomes and (B) drug leakage stability of common vincristine liposomes and nanobowl-supported vincristine liposomes in FBS.

Similarly, the tissues of important organs of tumor-bearing mice were taken and observed after pathological section staining to investigate the effects of different dose groups on the organs of mice. Results As shown in FIG. 21, there was no significant toxicity to liver, kidney, spleen and lung of mice in each experimental group; doxorubicin is more toxic to the heart, leading to the lysis and rupture of cardiomyocytes; the nanobowls@Dox-liposomes and common Dox-liposomes could significantly reduce the toxic side effects of doxorubicin on the heart, and no obvious pathological changes were observed in pathological sections; in addition, no significant toxicity was observed for heart, liver, spleen, lung liver, spleen, lung, kidney and other tissues, suggesting that this carrier is non-toxic and has good biocompatibility.

IV. Discussion

1. Effect of Nanob Owl Support on Whole Treatment of Breast Cancer In Vivo

Based on the previous experimental results, the nanobowl support can show significantly better efficacy in the treatment of mouse breast cancer than the other experimental groups, whether the inhibition of tumor volume or the prolongation of mouse survival curve, which is just opposite to that of Example 3 in vitro cell level. At the cell level in vitro, free doxorubicin with the strongest cytotoxicity had the worst effect; however, the inhibitory effect of common Dox-liposomes, which had the same effect as that of nanobowls@Dox-liposomes in vitro, was not as prominent as that of the nanobowls@Dox-liposomes in mice, but still slightly better than free adriamycin; and, nanobowls@Dox-liposomes showed the best anti-tumor effect, and the tumor volume plan no longer increased. The reasons are as follows: firstly, the poor long-circulating characteristics and rapid clearance rate of free doxorubicin result in a large amount of doxorubicin not reaching the tumor site, thus affecting the efficacy of doxorubicin; in the case of Dox-liposomes, the entrapment of liposomes can increase the residence time in the circulatory system to some extent, but the experiments show that there is an early leakage of the drug, resulting in a certain reduction of the drug reaching the tumor site; and the supporting role of the nanobowl provides a "hard" inner container for the liposome, so that the liposome can endure the impact and destruction action of various factors in the circulatory system, reduces the leakage of the content drug as much as possible before reaching the tumor site, allows more adriamycin to reach the tumor site with the circulatory system, thereby better exerting the drug therapeutic effect.

2. Impact of Nanobowl Support on Tumors and Important Organs

Through research on mice tumor tissues and tissue sections of important organs, it is found that, compared with common Dox-liposomes, nanobowls@Dox-liposomes could inhibit the proliferation of tumor cells, promote the apoptosis of tumor cells, and reduce the side effects of doxorubicin on the heart. The reason may be closely related to the supporting role of nanobowl. The supporting role of nanobowl can reduce the early leakage of doxorubicin in the circulation process in vivo, so that it can carry more drugs to the tumor site, thereby improving the efficacy; at the same time, due to the reduction of free drug leakage, the drug concentration in organ tissues is reduced, thereby reducing the toxicity to other organs.

V. Summary

In this study, an orthotopically inoculating 4T1 breast cancer model was successfully established in BALB/c female mice, and different drugs were injected into the tail vein of tumor-bearing mice to observe the therapeutic effect of each group. The overall evaluation of macroscopic efficacy of mice after administration was performed by detecting the body weight, tumor volume and survival curve of mice; through immunohistochemical staining analysis of tumor tissues and important organs, the apoptosis, proliferation and organ necrosis of tumor tissues were investigated, and the effect of anti-tumor treatment was further analyzed and evaluated from the microscopic perspective. The results showed that the overall anti-tumor effect of Nanobowls@Dox-liposomes was the best, followed by common Dox-liposomes, while the free doxorubicin group was less effective, and the body weight of mice decreased significantly during administration. The H&E results also showed that the toxicity to the heart was greater.

Example 5 Preparation of Nanobowl-Supported Irinotecan/Vincristine Liposomes

The preparation method therefor is substantially the same as that in Examples 1-2, and reference can be made to Examples 1-2 only in that doxorubicin therein is replaced with irinotecan or vincristine.

Example 6 Nanobowl-Supported Irinotecan/Vincristine Liposome Effect Experiment

I. Experimental Method:

To detect serum-induced membrane instability and irinotecan or vincristine leakage, irinotecan or vincristine liposomes or nanobowls@liposomes were dispersed in pure FBS (fetal bovine serum) at 37° C., shaken at 200 rpm, and after a certain time, the liposomes were purified by Zebaspin desalting column (Thermo-Scientific) to remove irinotecan or vincristine other than the liposomes. The drug-retaining liposomes were mixed with 9 volumes of 0.75 M HCL (containing 90% isopropanol) and centrifuged. The supernatant containing irinotecan or vincristine was evaporated in a SpeedVac concentrator (Thermo Scientific) and the residue was dissolved in 200 microliters of a mobile phase consisting of methanol, acetonitrile, water and trifluoroacetic acid at 24:24:52:0.1 (v/v, pH=3.0) at a flow rate of 1 mL/min and separated on a diamonsil C18 column (4.6×150 mm, 5 μm, Dikma, china) with detection at 254 nm. The leakage of liposomes in FBS was calculated.

II. Experimental Results

The results showed that compared with common irinotecan liposome (Irinotecan-LP) and vincristine liposome (Vincristine-LP), the leakage rate of nanobowl-supported irinotecan liposome (NB@Irinotecan-LP) and vincristine liposome (NB@Vincristine-LP) was significantly reduced, showing high serum stability.

The present disclosure successfully synthesizes nanoparticles with a bowl-like structure, improves and optimizes the nanoparticle synthesis recipe, and establishes a complete set of characterization and identification methods for nanobowls. The nanobowl-supported drug-loaded liposome delivery system was successfully constructed, the loading mode of doxorubicin hydrochloride/irinotecan/vincristine was explored and established, and the high entrapment efficiency of doxorubicin/irinotecan/vincristine was achieved. Subsequently, the present disclosure more fully explored the stability of nanobowl-supported drug-loaded liposomes and evaluated their cellular uptake behavior and cytotoxicity at the cellular level in vitro. The stability test results showed that the nanobowl-supported drug-loaded liposomes could reduce the leakage rate of drug-loaded liposomes in the circulatory system; at the same time, it can be better redispersed after the freeze-drying treatment, so as to facilitate the preparation of freeze-dried powder; in addition, the nanobowls@Dox-liposome dispersion could be stored at 4° C. for up to 120 days without sedimentation or agglomeration, with good dispersion. The results of cellular assays showed that the addition of nanobowl did not adversely affect the cellular uptake behavior and cytotoxicity of drug-loaded liposomes. Finally, the present invention successfully constructed an orthotopic inoculation model of 4T1 breast cancer to investigate the therapeutic effect of nanobowls@Dox-liposomes on breast cancer. The results showed that the nanobowls@Dox-liposomes could effectively inhibit tumor growth and significantly prolong the survival time of tumor-bearing mice; at the same time, compared with the other four experimental groups, nanobowls@Dox-liposomes could significantly reduce the proliferation of tumor cells and promote tumor cell apoptosis; while the results of body weight and organ staining showed that the nanobowls@Dox-liposomes could effectively reduce the toxic side effects of doxorubicin and improve the quality of life of mice. The present disclosure discloses a new method for improving anti-tumor efficacy by improving the circulation stability of liposomes and reducing drug leakage, thus providing a new idea and theoretical basis for anti-tumor treatment.

While the foregoing is directed to the preferred embodiments of the present disclosure, it will be understood by those skilled in the art that various changes may be made and equivalents may be substituted for elements thereof without departing from the spirit and scope of the present disclosure.

What is claimed is:

1. Nanobowl-supported doxorubicin/irinotecan/vincristine liposomes, wherein the preparation method comprises the following steps:
   (1) preparation of nanobowls: preparing polystyrene nanoparticles→preparing 3-trimethoxysilylpropyl methacrylate coated modified polystyrene nanoparticles→preparing nanoparticles comprising two connected hemispheres→preparing silica modified nanoparticles comprising two connected hemispheres→obtaining nanobowls;
   (2) preparation of nanobowl-supported unloaded liposomes: taking (3-aminopropyl)triethoxysilane and the nanobowl prepared in step (1) to perform amination modification of the nanobowl to obtain an aminated nanobowl→transferring the aminated nanobowl into a prepared ammonium sulphate solution by a centrifugal method to obtain an ammonium sulphate solution of the aminated nanobowl, shaking same to form vesicles encapsulated with the nanobowl→performing probe ultrasound on the vesicles encapsulated with the nanobowl to obtain nanobowl-supported unloaded liposomes;
   (3) preparation of nanobowl-supported doxorubicin/irinotecan/vincristine liposomes: encapsulating the doxorubicin/irinotecan/vincristine by active loading of ammonium sulfate to obtain nanobowl-supported doxorubicin/irinotecan/vincristine liposomes;
   wherein the nanobowl-supported doxorubicin/irinotecan/vincristine liposomes have an average particle size of 140-150 nm and a Zeta potential of −18 to −16 mV.

2. The nanobowl-supported doxorubicin/irinotecan/vincristine liposomes of claim 1, wherein the particle size of the polystyrene nanoparticles in step (1) is 45-55 nm; the nanoparticles comprising two connected hemispheres are prepared by a styrene monomer and 3-trimethoxysilylpropyl methacrylate modified polystyrene nanoparticles according to a feed volume ratio of 3:1; the silica-modified nanoparticles comprising two connected hemispheres are prepared with 0.3 g of tetraethylorthosilicate.

3. A preparation method of the nanobowl-supported doxorubicin/irinotecan/vincristine liposomes of claim 1, comprising the following steps:
   (1) preparation of nanobowls: preparing polystyrene nanoparticles→preparing 3-trimethoxysilylpropyl methacrylate coated modified polystyrene nanoparticles→preparing nanoparticles comprising two connected hemispheres→preparing silica modified nanoparticles comprising two connected hemispheres→obtaining nanobowls;
   (2) preparation of nanobowl-supported unloaded liposomes: taking (3-aminopropyl)triethoxysilane and the nanobowl prepared in step (1) to perform amination modification of the nanobowl to obtain an aminated nanobowl→transferring the aminated nanobowl into a prepared ammonium sulphate solution by a centrifugal method to obtain an ammonium sulphate solution of the aminated nanobowl, shaking same to form vesicles encapsulated with the nanobowl→performing probe ultrasound on the vesicles encapsulated with the nanobowl to obtain nanobowl-supported unloaded liposomes;
   (3) preparation of nanobowl-supported doxorubicin/irinotecan/vincristine liposomes: encapsulating doxorubicin/irinotecan/vincristine by active loading of ammonium sulfate to obtain nanobowl-supported doxorubicin/irinotecan/vincristine liposomes.

4. The preparation method of claim 3, characterized in that the preparation method of the nanobowl in step (1) comprises:
   1) preparation of polystyrene nanoparticles: synthesizing polystyrene nanoparticles by emulsion polymerization with styrene as the monomer, sodium dodecyl sulfate as the emulsifier and potassium persulfate as the initiator;

2) preparation of 3-trimethoxysilylpropyl methacrylate-coated modified polystyrene nanoparticles: adding styrene, 3-trimethoxysilylpropyl methacrylate and 2-2-azobis 2-methyl propionitrile on the basis of the synthesized polystyrene nanoparticles to synthesize 3-trimethoxysilylpropyl methacrylate-coated modified polystyrene nanoparticles through a polymerization reaction;
3) preparation of nanoparticles comprising two connected hemispheres: mixing the 3-trimethoxysilylpropyl methacrylate coated modified polystyrene nanoparticles prepared in 2) with styrene and sodium 4-vinyl-benzenesulfonate, stirring same in ultrapure water, using the swelling effect of polystyrene to make 3-trimethoxysilylpropyl methacrylate coated modified polystyrene nanoparticles deform and burst, then adding 2-2-Azobis 2-methyl propionitrile to initiate polymerization reaction again, and finally forming nanoparticles comprising two connected hemispheres;
4) preparation of silica-modified nanoparticles comprising two connected hemispheres: transferring the nanoparticles comprising two connected hemispheres obtained in 3) into anhydrous ethanol by means of ultracentrifugation and redispersion, then adding 25% ammonium hydroxide solution water to prepare an ethanol solution containing 50% tetraethylorthosilicate, and slowly adding dropwise to obtain silica-modified nanoparticles comprising two connected hemispheres;
5) preparation of nanobowls: transferring the silica-modified nanoparticles comprising two connected hemispheres obtained in 4) to a rotary evaporator, evaporating excess ethanol, adding tetrahydrofuran to dissolve, and collecting the precipitate by ultracentrifugation to obtain the final product, a nanobowl.

5. The preparation method of claim 3, characterized in that the polystyrene nanoparticles of step (1) have a particle size of 50 nm; the nanoparticles comprising two connected hemispheres are prepared by a styrene monomer and 3-trimethoxysilylpropyl methacrylate modified polystyrene nanoparticles according to a feed volume ratio of 3:1; the silica-modified nanoparticles comprising two connected hemispheres are prepared with 0.3 g of Tetraethylorthosilicate.

6. A method for treating a tumor in a subject in need thereof, comprising administering a therapeutically effective amount of the nanobowl-supported doxorubicin/irinotecan/vincristine liposomes according to claim 1 to the subject.

\* \* \* \* \*